United States Patent [19]
Colgate et al.

[11] Patent Number: 5,952,796
[45] Date of Patent: Sep. 14, 1999

[54] COBOTS

[76] Inventors: James E. Colgate, 2210 Ashbury, Evanston, Ill. 60201; Michael A. Peshkin, 4843 Fargo, Skokie, Ill. 60077

[21] Appl. No.: 08/959,357

[22] Filed: Oct. 28, 1997

Related U.S. Application Data

[63] Continuation-in-part of application No. 08/605,997, Feb. 23, 1996.

[51] Int. Cl.$^6$ ....................................................... H02K 7/00
[52] U.S. Cl. ............................. 318/1; 318/568.11; 901/19
[58] Field of Search ..................................... 318/1, 2, 580, 318/587, 568.11, 568.12, 568.14, 625, 560; 901/1, 2, 4, 19, 20, 50; 180/6.44, 6.54–6.62

[56] References Cited

U.S. PATENT DOCUMENTS

| | | |
|---|---|---|
| 572,832 | 5/1896 | Samohod . |
| 1,256,234 | 2/1918 | Innes . |
| 2,139,635 | 12/1938 | House . |
| 2,477,527 | 7/1949 | Pierce . |
| 2,586,421 | 2/1952 | Evers . |
| 2,727,396 | 12/1955 | Haugwitz . |
| 5,116,180 | 5/1992 | Fang et al. . |
| 5,300,869 | 4/1994 | Skaar et al. . |
| 5,374,879 | 12/1994 | Pin et al. . |
| 5,389,865 | 2/1995 | Jacobus et al. . |
| 5,397,323 | 3/1995 | Taylor et al. . |
| 5,399,951 | 3/1995 | Lavallee et al. . |
| 5,459,382 | 10/1995 | Jacobus et al. . |
| 5,467,084 | 11/1995 | Alofs et al. . |
| 5,487,437 | 1/1996 | Avitan . |
| 5,576,727 | 11/1996 | Rosenberg et al. . |
| 5,587,937 | 12/1996 | Massie et al. . |
| 5,625,576 | 4/1997 | Massie et al. . |

OTHER PUBLICATIONS

Book et al., The Concept and Implementation of a Passive Trajectory Enhancing Robot, DSC–vol. 58, Proceedings of the ASME Dynamics Systems and Control Division, 1996, pp. 633–638.

Peshkin et al., Passive Robots and Haptic Displays Based on Nonholonomic Elements, Proceedings of the 1996 IEEE International Conference on Robotics and Automation, Minneapolis, Minnesota, Apr. 1996, pp. 551–556.

Colgate et al., Nonholonomic Haptic Display, Proceedings of the 1996 IEEE International Conference on Robotics and Automation, Minneapolis, Minnesota, Apr. 1996, pp. 539–544.

Colgate et al., Cobots: Robots for Collaboration With Human Operators, Proceedings of the ASME Dynamic Systems and Control Division, DSC–vol. 58, Nov. 1996, Atlanta, GA, pp. 633–638.

Kelley et al., On The Development Of a Force–Feedback Mouse and Its Integration Into a Graphical User Interface, DSC–vol. 55–1, Proceedings of the ASME Dynamics and Control Division, 1994, pp. 287–294.

(List continued on next page.)

*Primary Examiner*—Brian Sircus
*Attorney, Agent, or Firm*—McDonnell Boehnen Hulbert & Berghoff

[57] ABSTRACT

An apparatus and method for direct physical interaction between a person and a general purpose manipulator controlled by a computer. The apparatus, known as a collaborative robot or "cobot," may take a number of configurations common to conventional robots. In place of the actuators that move conventional robots, however, cobots use variable transmission elements whose transmission ratio is adjustable under computer control via small servomotors. Cobots thus need few if any powerful, and potentially dangerous, actuators. Instead, cobots guide, redirect, or steer motions that originate with the person. A method is also disclosed for using the cobot's ability to redirect and steer motion in order to provide physical guidance for the person, and for any payload being moved by the person and the cobot. Virtual surfaces, virtual potential fields, and other guidance schemes may be defined in software and brought into physical effect by the cobot.

49 Claims, 19 Drawing Sheets

OTHER PUBLICATIONS

Massie et al., The Phantom Haptic Interface: A Device for Probing Virtual Objects, DSC–vol. 55–1, Proceedings of the ASME Dynamics Systems and Control Division, 1994, pp. 295–301.

Salcudean et al., On the Emulation of Stiff Walls and Static Friction With a Magnetically Levitated Input/Output Device, DSC–vol. 55–1, Proceedings of the ASME Dynamics Systems and Control Division, 1994, pp. 303–309.

Gillespie et al., Stable Use–Specific Haptic Rendering of the Virtual Wall, DSC–vol. 58, Proceedings of the ASME Dynamics Systems and Control Division, 1996, pp. 397–406.

Rosenberg, The Use of Virtual Fixtures to Enhance Telemanipulation With Time Delay, DSC–vol. 49, Proceedings of the ASME Advances in Robotics, Mechatronics, and Haptic Interfaces, 1993, pp. 29–36.

Dvorak, Your Guide to Variable–Speed Mechanical Drives, pp. 244–255, Mechanisms and Mechanical Devices Sourcebook, Nicholas P. Chironis, Ed., McGraw Hill, 1991.

Ollero et al., Stability Analysis of Mobile Robot Path Tracking, IEEE/RSJ Int'l Conference on Intelligent Robots and Systems (IROS), Pittsburgh, PA, vol. 3, 1995.

Ellis et al., Design and Evaluation of a High–Performance Prototype Planar Haptic Interface, DSC–vol. 49, Proceedings of the ASME Dynamics Systems and Control Division, 1993, pp. 56–64.

Sordalen et al., Design of a Nonholonomic Manipulator, Proceedings of the 1994 IEEE International Conference on Robotics and Automation, pp. 8–13.

Chung et al., Prototyping a Nonholonomic Manipulator, Proceedings of the 1995 IEEE International Conference on Robotics and Automation, Nagoya, Japan, May 21–27, 1995.

Kazerooni, The Human Power Amplifier Technology at the University of California, Berkeley, DSC–vol. 57–2, 1995 IMECE Proceedings of the ASME Dynamic Systems and Control Division, ASME 1995.

Russo et al., Controlling Dissipative Magnetic Particle Brakes in Force Reflective Devices, 1992 ASME Winter Annual Meeting, H. Kazerooni, Ed., Anaheim, CA, pp. 1–8.

Delnondedieu et al., PADyC: a Passive Arm with Dynamic Constraints. A prototype with two degrees of freedom, Medical Robotics and Computer–Aided Surgery, 1995, pp. 173–180.

COBOTS

CROSS-REFERENCE TO RELATED APPLICATIONS

This application is a continuation-in-part of U.S. patent application Ser. No. 08/605,997, filed on Feb. 23, 1996.

BACKGROUND OF THE INVENTION

The present invention relates to the field of software programmable robotic manipulators and assist devices, and in particular, robotic manipulators and assist devices that can directly interact with a human operator.

Various types of computer controlled machines have been developed in order to automatically perform or assist humans in performing routine or repetitive tasks. One class of devices developed for this purpose are computer controlled specialized machines that perform a particular task automatically. A specialized machine is a machine that is created for the purpose of performing a particular task, and which generally may not be reprogrammed or reconfigured to perform a substantially different task.

One example of a specialized machine is a computer controlled motorized arm that removes bottle caps from a conveyor belt and screws them onto bottles on another conveyor belt. Such a machine could have two axes of motion (also known as degrees of freedom). One would be a translational motion moving the cap from its location on one conveyor belt and positioning it over the bottle on another conveyor belt. The other would be a rotational motion that rotates the cap to engage it with the threads of the bottle. Each of these motions is driven by an actuator, such as an electric motor. Although this specialized machine may be controlled by software, the ability to reprogram the machine is very limited. For example, such a machine might be able to be reprogrammed to accommodate a different bottle having a different number of threads, or perhaps two different types of bottles on the same line. However, more complex modifications generally would not be permitted.

The major drawback to specialized machines as described above is their lack of programmability, which severely limits the range of tasks that they can perform. Not only can specialized machines not be reprogrammed to perform a different task, but, in fact, even modifications to the particular task they have been designed to perform may require hardware changes. For example, in the arm device described above, while the length of the arm's swing may be adjusted by software control to reach bottles at different positions on the conveyor belt, the device could not be merely reprogrammed to cope with bottles of different heights. To do so would necessitate a hardware change in order to add another translational axis of motion to allow vertical travel, resulting in three axes of motion rather than two. This lack of flexibility severely limits the utility of specialized machines.

Another type of computer controlled machine is a conventional robot. Unlike specialized machines, robots are designed to be adaptable to diverse tasks simply by reprogramming the robot. Consequently, robots generally have more mechanical flexibility so that they can be adapted to a number of different tasks. Generally, robots have one actuator, such as an electric motor or hydraulic cylinder, for each degree of freedom. The robot can perform tasks within an area known as its "workspace," which is defined as any volume of space that the robot can reach. Thus, robots are advantageous in that, unlike a specialized machine, they may be adapted to a variety of tasks by simply reprogramming the device.

Conventional robots, however, do not collaborate well with human workers. In fact, robots have been shown to be quite dangerous to the humans that must come into contact with them. For example, in a factory environment, a robot must often be designed to operate at high speed and to carry heavy payloads, requiring powerful actuators. Unfortunately, however, hardware and software errors may occur that cause the robot to malfunction. In such a case, the speed and power of the robot can have devastating consequences on anyone or anything in its vicinity. For example, a malfunction could cause the robot to move out of control and strike a nearby person with enough force to cause injury or death. Similarly, a robot might move a large piece of heavy machinery in an unpredictable direction, causing injury to persons or property. As a result of these dangers, people are normally excluded from the robot's workspace during its operation. In those instances where a person must be in the vicinity of the robot, such as medical applications, elaborate safeguards must be employed to slow the robot down or physically guard the person from unintended contact with the robot. This significantly reduces robots' ability to collaborate with a human. This is unfortunate, because collaboration between a robot and a human operator could relieve the human operator from the injurious physical requirements of a task, as well as providing the capability for computer control of the system.

Yet another disadvantage of conventional robots is that they often lack certain capabilities possessed by human workers. Such capabilities, which include human vision and tactile senses, allow human workers to cope with a much less structured environment than robots require. For example, in the bottle-capping example described above, a human worker can pick bottle caps out of a bin, while the robot requires the caps to arrive single-file so that they are at a predictable position for pick-up. In addition, a human worker can feel when a cap is cross-threaded, while a machine would not, except with the addition of considerable complexity. Similarly, human dexterity at assembling or joining workparts that do not quite fit or are not perfectly positioned is hard to duplicate mechanically. Instead, this situation must be avoided by more precise manufacturing of the parts themselves, at considerable additional expense. Moreover, the human ability to detect and deal with exceptional situations such as defective parts is also highly valuable. For all of these reasons, it is neither likely nor desirable that human workers will be removed from repetitive task environments and completely replaced by robots in the foreseeable future.

Another class of prior art devices are ergonomic assist devices designed to assist humans in performing a variety of tasks. These consist of primarily non-computerized, low-tech devices such as overhead rail systems, passive manipulator arms, or balancers. These devices perform functions such as counterbalancing loads against gravity (e.g., by use of a hoist), or lifting objects to an appropriate height to eliminate the need for an operator to bend over to manipulate a payload or workpiece (e.g. by use of a jack). Ergonomic assist devices have demonstrably improved the safety of numerous material handling operations, and are now widely found in production facilities, for example, in automobile assembly. It is not uncommon for a general assembly facility to employ hundreds of assist devices for lift assist alone. In addition, more complex assist devices that do more than counterbalance gravity are becoming increasingly prevalent in the automobile industry, and may be used for the installation of larger components such as cockpits, doors, seats, spare tires, exhaust pipes, driveshafts, radiators, and sunroofs.

While ergonomic assist device have proven valuable in manual handling, they have a number of drawbacks. One drawback is that they slow down the manual handling process due to the added inertia and friction of the assist device. For example, when moving a payload on an overhead rail or manipulator arm assist device, the operator must move not only the payload but also the assist device itself, which can be quite heavy. These problems are especially acute for more elaborate, and consequently heavier, devices. Assist devices do not provide any power assist or guidance that enables a human operator to overcome these inertial and frictional forces.

Another disadvantage of ergonomic assist devices are that they are not programmable and are typically customized to a particular task. For example, in the automobile industry, assist devices are typically customized to a particular body style and model. Thus, the life of a particular assist device may be limited to that of the production run, which may be only a few years. In contrast, programmable devices, like robots, can be reprogrammed to perform different tasks and thus can have a useful life far in excess of ergonomic assist devices.

Thus, in presently available devices, the need for ergonomic assistance, the need for freedom of motion desired by workers, and the need for software control of motion required by modern manufacturing practices, are conflicting requirements. Conventional assist devices for human workers are restrictive of their motion, and do not provide software control. Autonomous robots do not have the sensory capabilities or dexterity of human workers. Powered robots are considered unsafe for close association with humans. Thus, no one device meets all of these conflicting requirements.

In order to address some of these concerns, there have been a number of additional developments in recent years in the area of computer-controlled manipulators intended specifically for direct physical interaction with a human operator. These manipulators may be classified broadly as either active or passive. Active devices typically contain actuators at their joints and are capable of initiating motion. Passive devices, on the other hand, differ in that they cannot move without power input originating with the human operator. Unfortunately, none of these devices has proven successful in providing effective collaboration between machine and human.

Active computer controlled manipulators of this nature are generally known as "haptic interfaces." A haptic interface is a device which allows a human operator to touch, feel, and manipulate a computer simulation (also known as a "virtual environment"), or a remote manipulator. For example, in his dissertation"Virtual Fixtures: Perceptual Overlays Enhance Operator Performance in Telepresence Tasks," L. B. Rosenberg demonstrated that "haptic virtual fixtures," or hard walls that constrain motion to useful directions, can dramatically improve operator performance in teleoperation tasks such as remote peg-in-hole insertion. An example of a haptic interface is the "magic mouse" described by Kelley and Salcudean in their article "On the Development of a Force Feedback Mouse and its Integration Into a Graphical User Interface," International Mechanical Engineering Congress and Exposition, ASME, Chicago, Vol. DSC 55-1, pp. 287–94. This "magic mouse" is a computer interface device that can constrain an operator's hand to useful directions while interacting with a graphical user interface in order to avoid, for example, the cursor slipping off a pull-down menu.

Haptic displays have a number of significant drawbacks. One drawback is that haptic devices, being active, are capable of initiating motion and are therefore not as intrinsically safe as passive devices. Although this may not be a significant problem in small-scale desktop machines, it is a serious concern in large-scale machines, such as machines to assist an assembly line worker in manipulating parts weighing 20 to 500 pounds or more.

In addition to haptic displays, a number of passive computer-controlled manipulators have also been developed. One such device is a computer controlled manipulator with brakes rather than actuators at its joints, as disclosed in U.S. Pat. No. 5,201,772. This device also suffers from a number of disadvantages. One disadvantage is that such a device is not very flexible or successful at creating virtual walls or other surfaces. Because of the use of brakes at its actuators, this device can only effectively create virtual walls in certain directions. For example, it is very difficult to set up a curved virtual wall because the brakes used in the device can emulate the behavior of a wall only by dissipating energy in certain directions. Even if such a wall is set up, this dissipation of energy results in virtual walls that do not feel smooth but rather feel jagged or sticky.

Another similar device is described by M. Russo and A. Tadros in their article "Controlling Dissipative Magnetic Particle Brakes in Force Reflective Devices," ASME Winter Annual Meeting, Anaheim, Calif., pp. 63–70. This article describes a manipulator that includes both brakes and actuators at its joints. The actuators allow the device to improve upon the feel of a device based on brakes alone. On the other hand, because it is an active device, like a conventional robot, with actuators at its joints, it suffers from the disadvantages of such active devices described above.

Another similar device has been developed by R. A. Charles in his thesis, "The Development of the Passive Trajectory Enhancing Robot," at Georgia Institute of Technology. This device is based on the use of both brakes and clutches. Because clutches can transfer energy from one joint to another, the addition of clutches can potentially improve the feel of a virtual wall compared to a design based on brakes alone. This device is also disadvantageous, however, in that the number of clutches required can be quite large, and increases significantly as the degrees of freedom of the manipulator grow. Thus, non of these devices effectively allow collaboration between a human operator and a computer controlled manipulator without the dangers and disadvantages inherent in prior art robotic and mechanical assist devices.

Accordingly, it is an object of the invention to provide a device and method that will overcome the deficiencies found in the prior art.

It is another object of the invention to provide an assist device that can collaborate with a human operator without the dangers and limitations found in prior art robotic systems.

It is another object of the invention to provide an assist device that is computer controlled and can be reprogrammed to cope with different situations and/or tasks.

It is another object of the invention to provide an assist device that can compensate for any added friction and inertia caused by the assist device and its payload.

It is another object of the invention to provide an assist device that can direct the motion of a human operator and payload without the use of powerful actuators.

It is another object of the invention to provide a method for allowing a human operator to collaborate with an assist device without the deficiencies found in prior art robotic systems.

SUMMARY OF THE INVENTION

The present invention is embodied in a new type of robotic device, called a collaborative robot or "cobot." A cobot makes possible a direct physical collaboration between a person and a computer controlled manipulator. Cobots may take a number of configurations common to conventional robots. In place of the actuators that move robots, however, cobots use variable transmission elements whose transmission ratio is adjustable under computer control by use of small steering motors. Thus, cobots need few, if any, powerful and potentially dangerous actuators. Instead, cobots guide, redirect, or steer motions that originate with the human operator. Virtual surfaces, virtual potential fields, and other guidance schemes may be defined in software and brought into physical effect by the cobot. Thus, both the cobot and the human operator exert forces on a common object, which may be a tool or a payload. The object itself may even be absent, for example, for exercise or therapeutic purposes the cobot may guide human motion itself.

A cobot may be designed so that it only responds to the forces exerted by the human operator after filtering or modification by the cobot's software. For example, the cobot may comply fully with the human operator's intended motions in some regions of its workspace, but refuse to pass through some "virtual surfaces" or boundaries defined in software. These virtual surfaces or boundaries might be set up, for example, to guard against collisions. When the cobot is pushed by the operator into contact with a software-defined virtual surface, it is as if a real surface has been contacted—the cobot prevents any motion that would penetrate the boundary and only allows motion tangent to the boundary instead.

This physical interaction of the cobot with a human operator requires that the cobot be able to resist forces comparable to those exerted by the human operator. Otherwise, the cobot would be overpowered and could, for instance, be pushed through a virtual surface that the cobot is attempting to define. The cobot also implements this resistance in a fully flexible and software-controlled manner, so that the cobot can be reprogrammed like a robot.

As mentioned previously, motors of sufficient strength to directly oppose forces applied by a human operator can be dangerous and do not allow for easy interaction with a human. Instead of using such motors to resist and guide motion, cobots direct and constrain motion by use of one or more variable or steerable transmission elements known as "nonholonomic" transmission elements. Nonholonomic transmission elements are elements which couple two or more velocities of motion, but do not constrain positions. Examples of nonholonomic transmission elements include wheels and other steerable devices that couple one direction of velocity to another but which do not constrain the position of the device. Nonholonomic transmission elements are also referred to as "continuously variable" transmission elements, or CVTs.

Thus, unlike a conventional robot, each joint or axis of motion of a cobot is met not by a powerful motor or actuator, but by a transmission element. These transmission elements are mechanical devices, not motors, and thus cannot supply energy. As a result their failure will not result in sudden motion. The steering or adjustment of these transmission elements is performed by a motor under the command of a computer. The motor that performs this adjustment is small, and only needs to supply steering forces to the transmission element, not large forces sufficient to move the payload or resist forces applied by the human operator. Furthermore, the motor does not couple to motion of the payload, but rather only moves the internal mechanisms of the transmission element. The fact that the motors are controlled by a computer allows the cobot to be reprogrammed to accommodate different tasks for greater flexibility. The ability to resist large forces, comparable or greater than that of the human operator, originates in the mechanical strength of parts of the transmission elements, not in large motors.

Cobots may be either passive or active. In passive form, the cobot itself does not supply motive power, but rather motive power is supplied by the human operator. The cobot merely uses relatively small steering motors in order to guide the direction of motion of the cobot in a desired fashion in response to forces applied by the human operator and information stored by a control computer. Cobots can also be made "active" in order to include, for example, power assist and/or braking functions to assist or resist forces applied by the human operator. One type of active cobot includes a common link with may be coupled to an actuator or brake to assist or resist forces applied by a human operator. Like passive cobots, active cobots also use one or more nonholonomic transmission elements to control forces provided by a human operator.

DETAILED DESCRIPTION OF THE PREFERRED EMBODIMENTS

It is important to recognize that cobots may take many different forms depending on the particular requirements of the system to be implemented and the particular problems to be solved. While the invention will be described in connection with certain specific embodiments of a cobot, this description is not intended to limit the invention to those embodiments. Rather, the invention is intended to cover all types of designs and applications to which the technology may be beneficially applied.

The term "cobot," like the term "robot," refers to a class of general-purpose, programmable mechanical manipulators. A primary difference between robots and cobots lies in the method for controlling movement of the device. Robots generally consist of a number of mechanical links that incorporate actuators at each joint that provide the power to enable the robot to move. Cobots, on the other hand, do not incorporate actuators at each joint but rather are based on one or more continuously variable transmissions (CVTs) that act to couple the motions of two or more joints. These CVTs act as "nonholonomic" transmission elements because they impose a relationship among the directional velocities of the cobot but do not impose a relationship on the positional coordinates of the cobot. Each CVT incorporates a small actuator that varies the transmission ration of the CVT, but does not provide motive force. Cobots' use of CVTs rather than actuators allow collaboration with human operators, who provide the motive force that moves the cobot. The cobot actuators merely act to guide and direct motion.

Figure 1:
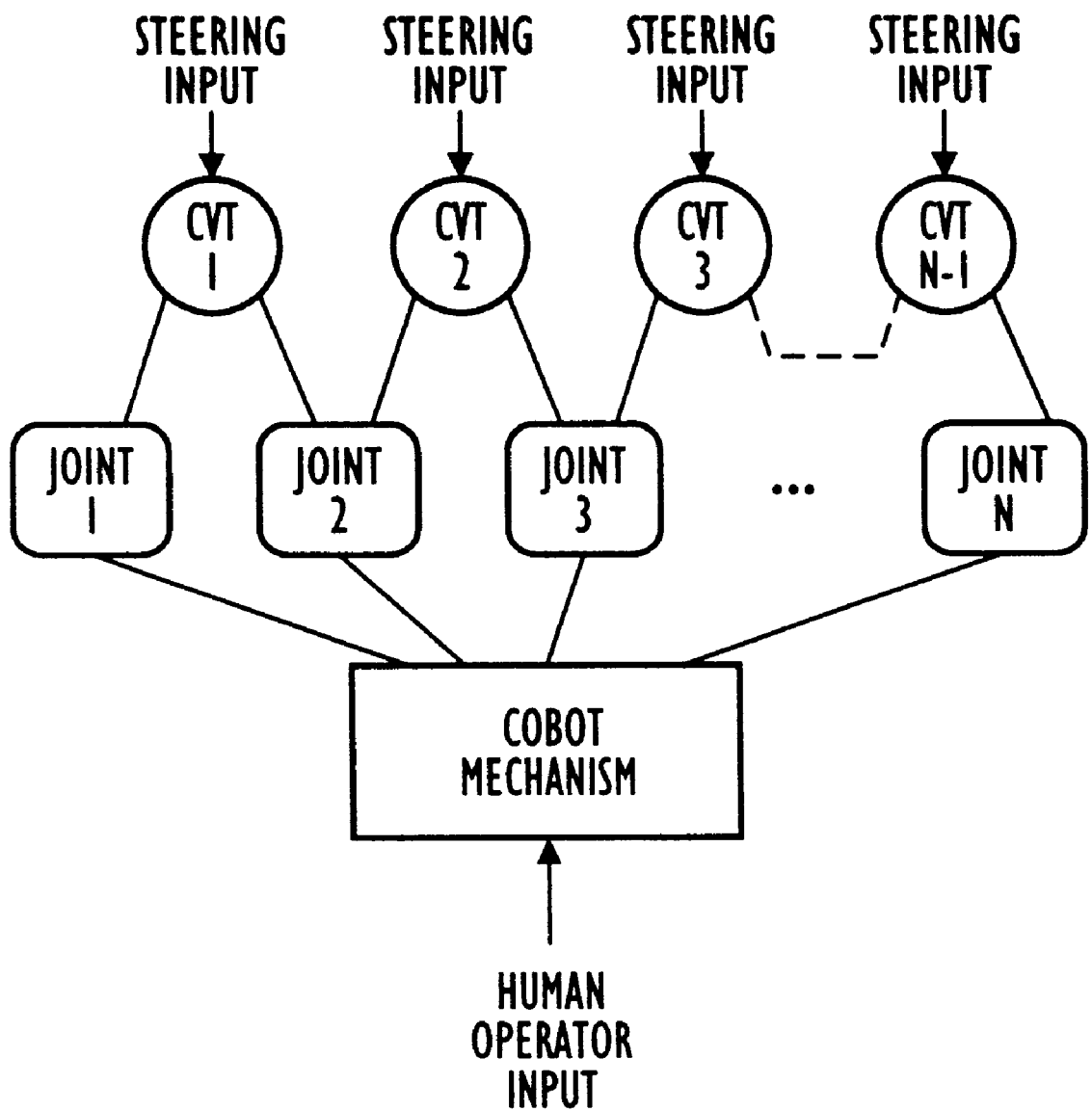
FIG. 1 is a diagram of a cobot architecture according to one embodiment of the present invention.

A general outline of one type of cobot architecture is shown in FIG. 1. The architecture shown in FIG. 1 includes a cobot mechanism that receives an input from a human operator. This input typically takes the form of a force applied by the human operator to the cobot mechanism. A cobot based on this architecture also includes a number of degrees of freedom, represented by joints N in FIG. 1. In this context, each joint represents an available direction of motion or degree of freedom of the cobot mechanism, which can be either translational or rotational. For example, a cobot that could move in the x and y directions would have two degrees of freedom, and thus two joints, one for each available direction of motion. A cobot that could also rotate about a fixed axis would have three degrees of freedom, and hence three joints. As further illustrated in FIG. 1, one or more CVTs are used to couple together two joints. In this architecture, the number of CVTs must be at least N-1, although additional CVTs can be added depending on the particular design constraints and goals to be achieved. The CVTs may take a number of forms, including, but not limited to wheels, spheres, or any other devices that can define a ratio between two directional velocities. Examples of different embodiments of CVTs will be discussed in more detail below.

Figure 2A:
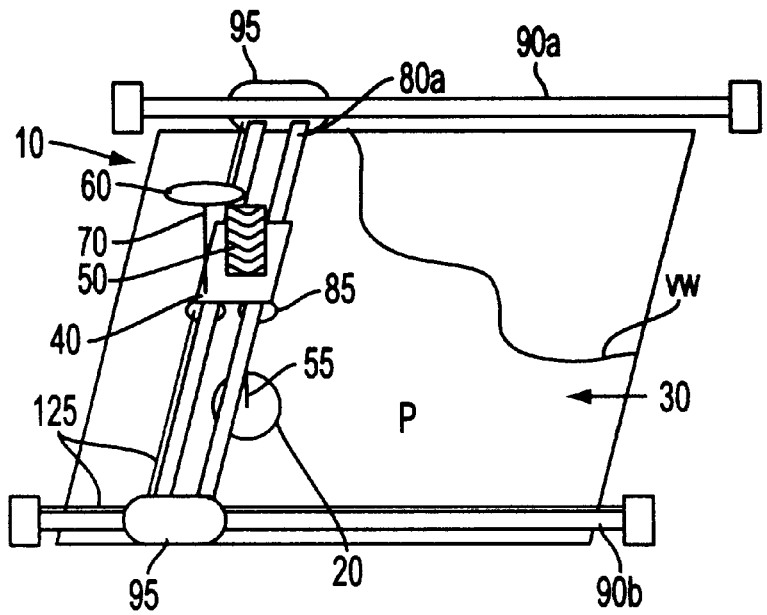
FIG. 2(a) is a diagram of a single-wheel cobot according to one embodiment of the present invention.
Figure 2B:
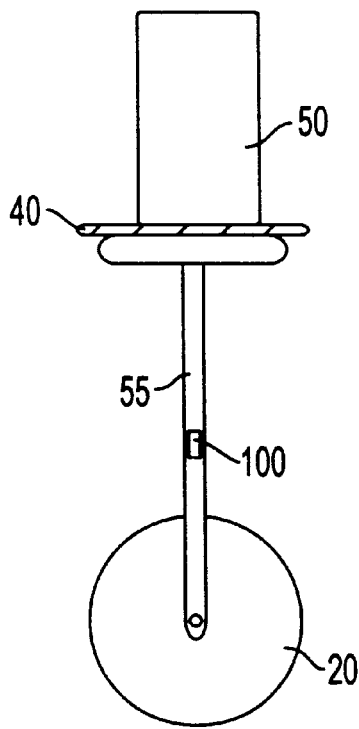
FIG. 2(b) is a side view of the single-wheel cobot of FIG. 2(a).
Figure 2C:
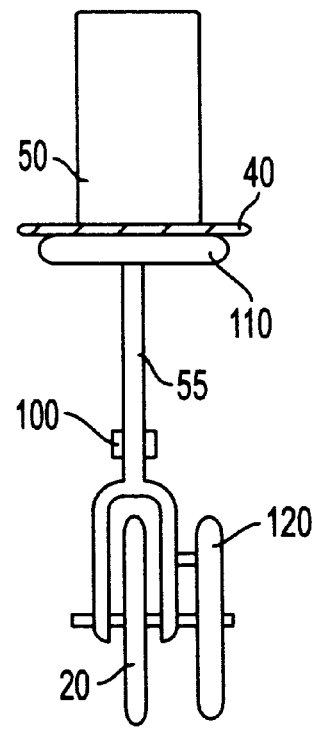
FIG. 2(c) is a front view of the single-wheel cobot of FIG. 2(a).

Cobots designed according to the architecture of FIG. 1 can take many forms. Perhaps the simplest type of cobot is one based on the use of a single wheel as the CVT. This cobot is not of the scale of an industrial assist device, but it illustrates the basic function and operation of cobots, and illustrates their utility. An example of this single-wheeled cobot is illustrated in FIGS. 2(a)–(c). As illustrated in FIG. 2(a), this cobot 10 includes a single wheel 20 as the CVT element, which is free to roll on a flat (planar) surface 30. Wheel 20 is mounted to a platform 40 and is not driven or braked, but rather is free to turn on its axle. Cobot 10 also includes a steering motor 50, mounted on top of platform 40, which is connected to wheel 20 via a vertical steering shaft 55. Steering motor 50 may be of conventional design, for example, a feedback servocontrolled steering motor using a belt drive or other suitable transmission. For simplicity in the figures, steering motor 50 is shown in a direct drive configuration in which the motor rotates steering shaft 55 directly. A non-rotatable handle 60, which can be operated by a human operator, is also attached to platform 40 via shaft 70. A payload (not shown) to be moved by a human operated may also be connected to or placed on platform 40.

Platform 40 is mounted on a set of Cartesian x-y rails 80a–b and 90a–b which act as joints and allow cobot 10 to move in two directions—the horizontal x-direction and the vertically direction. Rails hold wheel 20 and platform 40 upright and ensure that platform 40 can move only in directions strictly parallel to surface 30. Rails 80a–b include bushings 85 attached to platform 40 which allow platform 40 to slide freely on rails 80a–b. Rails 90a–b include bushings 95 which are attached to rails 80a–b and allow rails 80a–b to slide freely on rails 90a–b. Rails 80a–b and 90a–b further include configuration sensors 125 that sense the x-y position of handle 60. In a preferred embodiment, configuration sensors 125 can be linear potentiometers that sense the position of cobot 10. Because the workspace used by cobot 10 is two dimensional, linear potentiometers specify the platform's location using x and y coordinates. Cobot 10 includes no motors other than motor 50 used to steer the wheel 20, and therefore handle 60 is free to slide on the rails in response to forces applied by a human operator.

The steering mechanism of cobot 10 is shown in more detail in FIGS. 2(b)–(c). As shown in FIGS. 2(b)–(c), a force sensor 100 is mounted on steering shaft 55. Force sensor 100 may consist of any conventionally known force sensor, and in this embodiment consists of strain gauges mounted on opposite sides of steering shaft 55 that detect steering forces exerted by a human operator on shaft 55 that are perpendicular to the rolling direction of wheel 20. In another embodiment, force sensor 100 may be mounted to handle 60 rather than steering shaft 55. Because cobot 10 can only move in a planar area, force sensor 100 measures force using two coordinates, x and y, which specify how much force is being applied to the handle by the human operate in each of these orthogonal directions. Force sensor 100 is important to the collaboration of cobot 10 with a human operator because it measures the intent of the operator, or, in other words, the direction of motion that the operator wishes to move cobot 10. Because of this operation, force sensor 100 is also referred to as an "intent sensor."

Cobot 10 also includes a heading sensor 110 and a speed sensor 120. Heading sensor 110 is disposed beneath the platform 40 and measures the steering angle of the wheel 20 at a given point in time. Speed sensor 120 is disposed on the steering shaft 55 and measures the velocity of rotation of wheel 20. Heading sensor 110 and speed sensor 120 may be implemented by conventional sensor devices, such as optical encoders.

Figure 3:
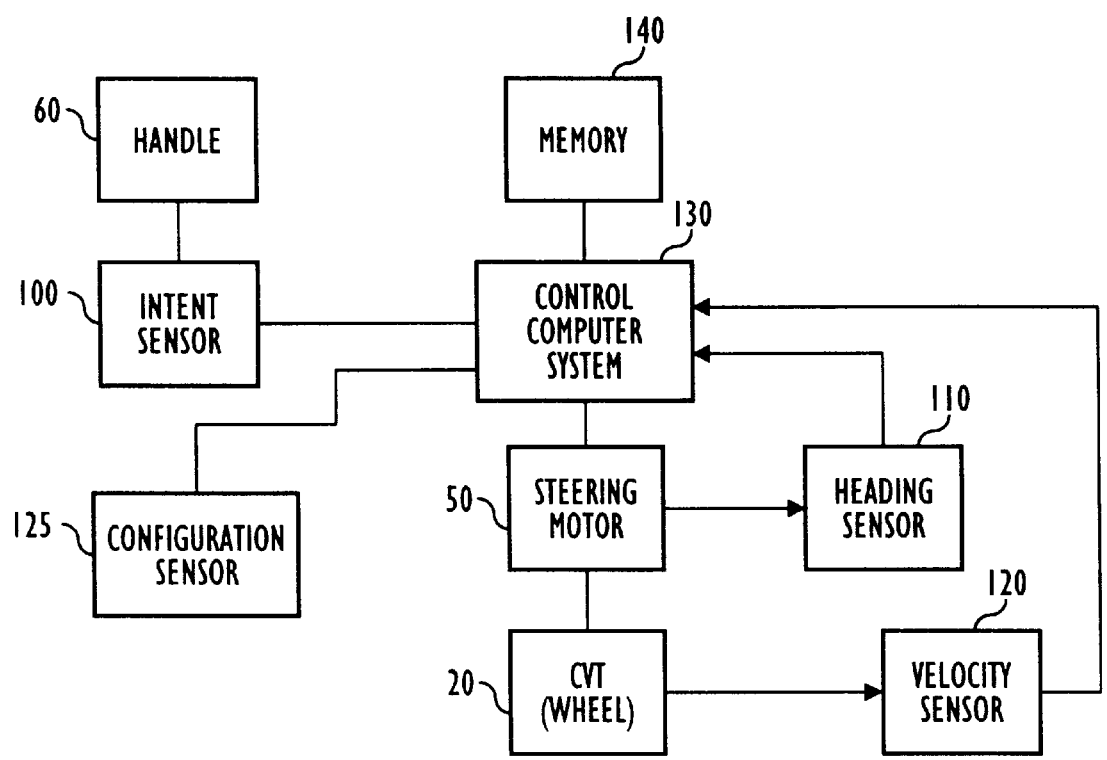
FIG. 3 is a block diagram of the control system of the embodiment of FIG. 2(a)–(c).

Cobot 10 further includes a control computer 130 (see FIG. 3). In this embodiment, computer 130 located away from cobot 10 and is connected via a cable, although computer 130 may also be mounted to the cobot depending on the size of the cobot and the computer. Computer 130 may be a conventional personal computer, or may be implemented on any computer system depending on the requirements of the particular system. As described in more detail below, control computer 130 receives inputs from force sensors 100 and encoders 110 and 120, and uses these inputs to control the steering angle of wheel 20.

As shown in FIGS. 2(b)–(c), wheel 20 has no caster but rather uses a straight-up steering shaft 55 connected to steering motor 50. As a result, the steering of the wheels is decoupled from the motion of the platform. In other words, motion of the platform does not exert any steering torque on wheel 20, and steering of wheel 20 does not exert any force on or create any translational motion of the platform. As a result, the platform can only be moved by force of the human operator, not by the control computer 120 or steering motor 50. Similarly, wheel 20 can only be steered by steering motor 50 in response to signals from control computer 120; and cannot be steered by the human operator directly. Thus, the computer 120 controls the direction of motion of platform 40 by controlling steering motor 50 to steer wheel 20, while the human operator controls the speed of motion of platform 40 by applying a force to handle 60. It is this interaction between human and computer that makes up the collaborative nature of a cobot.

A critical feature of the cobot 10 is that, although it has a two-dimensional workspace, cobot 10 has at any given time only one instantaneous mechanical degree of freedom. In this context, the term "instantaneous degrees of freedom" refers to the number of directions which the cobot 10 can move at any given instant. Because the wheel 20 cannot change its heading instantaneously, the only motion available to cobot 10 at any given instant is motion along the direction that the wheel is steered, which is one-dimensional motion along a line. In other words, at any given time cobot 10 may only be moved by the human operator in one direction—the direction to which wheel 20 has been steered. In contrast, a conventional robot typically has as many instantaneous degrees of freedom as there are dimension in its workspace because the robot typically has a joint for each workspace dimension, and motion is allowed in a different direction by each of these joints at any given time.

As used in cobot 10, wheel 20 functions as a "nonholonomic" transmission element because it imposes a relationship among the (x and y) velocities of cobot 10 but does not impose a relationship on the positional x and y coordinates of cobot 10. In contrast, a typical "holonomic" transmission element, such as a gear coupling two shafts together, does impose a relationship among positions—when one shaft turns a certain angle, the other will always turn by a fixed, corresponding angle. On the other hand, in cobot 10 the particular steering angle of wheel 20 has no relationship to the position of cobot 10 in the workspace, but does define the relationship between the speed of cobot 10 in the x-direction and its speed in the y-direction. This steering angle can be adjusted by a control input from the control computer 130.

For example, when wheel 20 of cobot 10 is steered to an angle of 45 degrees relative to the x axis, the x velocity and the y velocity are constrained to a 1:1 ratio. If the wheel is steered to a 90 degree angle, the constraint ratio is 0:1. Thus, for any particular wheel angle of wheel 20, a particular velocity ratio between the x and y translational velocities of platform 40 is enforced. If $\alpha$ is the angle that the wheel makes with respect to the x axis, the ratio of y velocity (y) to x velocity (x) is $y/x = \tan(\alpha)$. Platform 40, however, can, over time, reach any location in its workspace by virtue of the computer's control of the steering of the wheel. Thus, wheel 20 only acts to enforce the ratio of x and y velocities of the cobot, but does not constrain or define the position of the cobot.

Wheel 20 is also a continuously variable transmission element because it can be varied along a continuous series of velocity ratios, unlike a gear pair which has a fixed transmission ratio. Wheel 20 can be varied continuously between any possible steering angle and is not constrained to any particular ratio or set of ratios.

Figure 4:
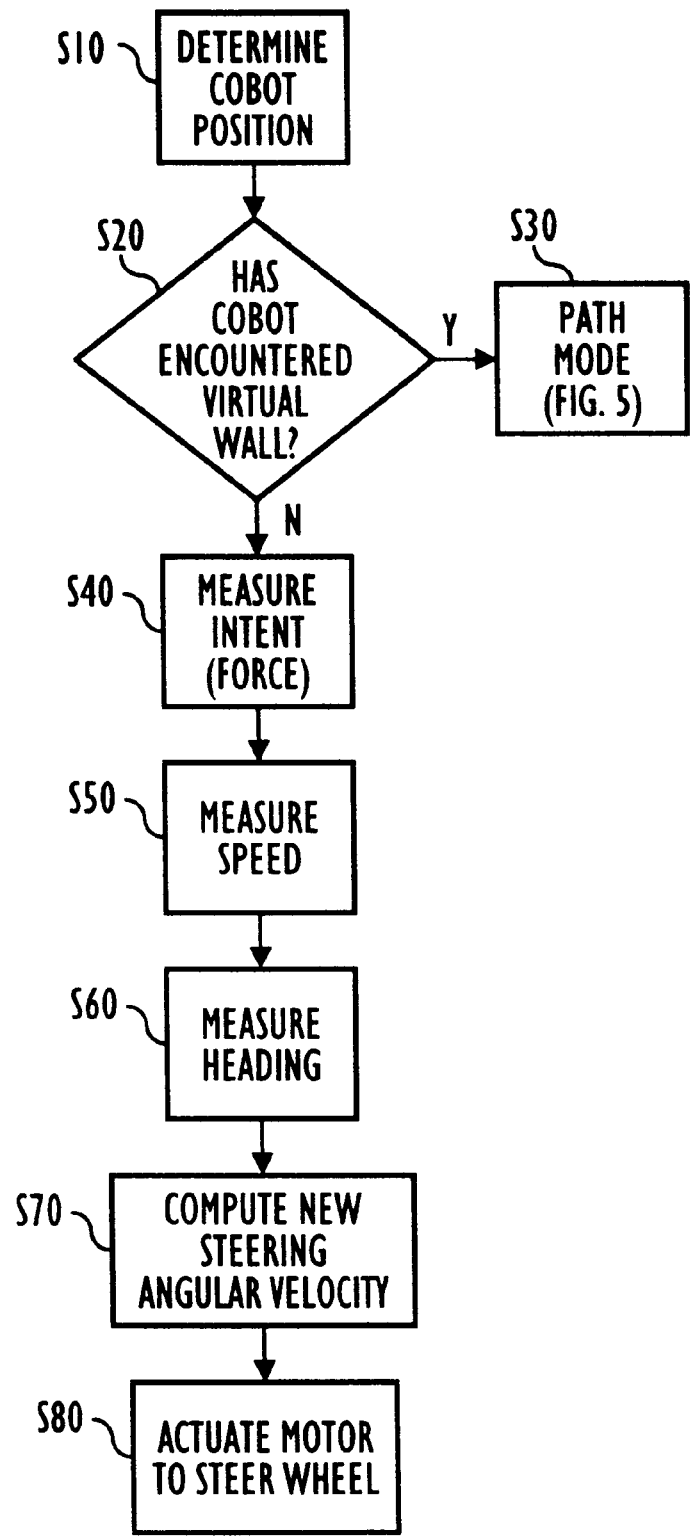
FIG. 4 is a flow chart illustrating the operation of the embodiment of FIG. 2(a)–(c) in free mode.
Figure 5:
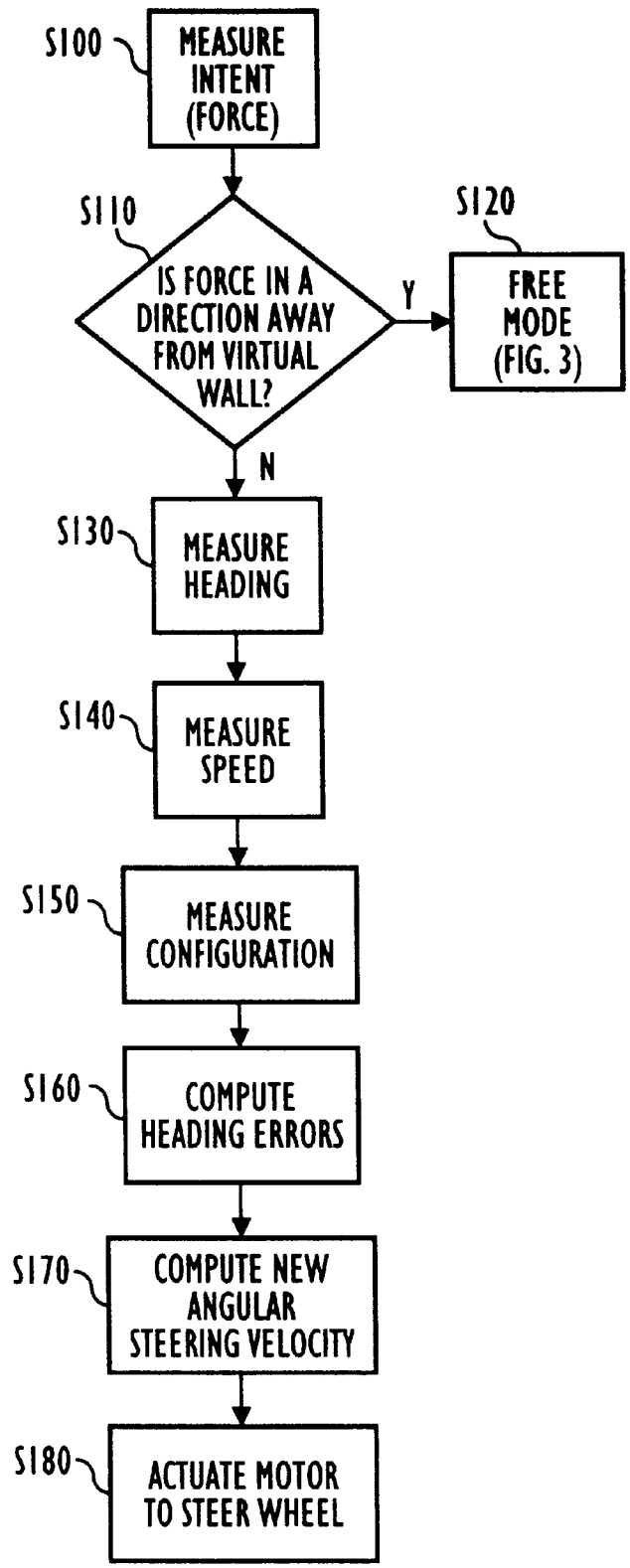
FIG. 5 is a flow chart illustrating the operation of the embodiment of FIG. 2(a)–(c) in path mode.

Although cobot 10 has only one instantaneous degree of freedom, software control allows it to operate as if it had two instantaneous degrees of freedom as shown in FIGS. 4–5. In other words, control computer 130 makes it appear to the human operator that cobot 10 can move in any direction in plane 30 in response to forces applied by the human operator. The fact that cobot 10 has only one instantaneous mechanical degree of freedom is very advantageous because can make cobot 10 behave and feel to a human operator as if it was confined to a smooth track. This behavior is very difficult to simulate with a conventional robot because the robot must specifically control each of its individual actuators at its joints to resist forces applied by the human operator. Additionally, because the computer control of the transmission elements of cobot 10, a great variety of collaborative interactions between human and machine become possible.

FIG. 3 is a block diagram of the control system of the cobot shown in FIGS. 2(a)–(c). As shown in FIG. 3, control computer 130 receives inputs from force sensor 100, heading sensor 110, speed sensor 120, and configuration sensor 125. The output of control computer 130 is connected to steering motor 50, which in turn is connected to wheel 20. Control computer 130 is also connected to a memory 140, which may store a control program for operating computer 130 as well as data defining constraints or virtual surfaces set up in the workspace. Although the control system of FIG. 3 has been described in conjunction with the cobot of FIGS. 2(a)–(c), it may also be used for more complex cobots as well, including the embodiments described later herein.

As will be described in more detail below, a customized workspace can be defined by control computer 130 and stored in memory 140. As shown in FIG. 2, this workspace includes a free region P and a virtual wall VW defined by control computer 130. Control computer 130 can also define may other types of virtual surfaces as well, including any type of surface or boundary defined by the software of computer 130. When cobot 10 is not in contact with a virtual surface, it enters "free mode," and can be moved in any direction in response to commands from control computer 130 in response to forces applied by the human operator. When cobot 10 approaches a virtual surface, control changes over to path mode, with the virtual surface itself being used to define the path of cobot 10. In path mode, when cobot 10 encounters a virtual surface, it veers off and follows tangent to the surface just as if it had hit a real surface. Thus, from the human operator's perspective, it feels as if there is a real physical boundary preventing cobot 10 from penetrating the virtual surface.

Referring to FIG. 2(a), when cobot 10 is in the free region P, it operates in free mode, and is controlled by control computer 130 to move in response to forces in any direction applied by a human operator. Thus, in free mode, cobot 10 appears to the operator to roll freely in any direction in response to force applied by the operator to handle 60. As described above, however, the physical structure of cobot 10 provides only one instantaneous degree of freedom, meaning that at any moment there is only one direction of motion available to the operator to move the payload. The appearance of two degrees of freedom is provided by computer 130, which receives an input from force sensor 100 informing computer 130 of which direction the operator is attempting to move the cobot 10, that is, of the operator's intent. Computer 130 then steers wheel 20 in such a way as to comply with whatever direction of motion the operator wishes to achieve, as indicated at each moment by the force sensor.

In practice, the human operator can be unaware that his or her attempts to move cobot 10 in one direction or another are not having a direct effect on cobot 10. In actuality, the steering of wheel 20 does not directly respond to forces applied by the human operator, but rather the control computer 130 interprets the human operator's efforts, and actively steers wheel 20 such that cobot 10 will move in the direction intended by the operator. The response of control computer 130 is so quick that the human operator cannot perceive any delay between his attempts to move cobot 10 and its resultant motion, and it feels to the operator as if cobot 10 responds just as it would if it were free to move without any constraint.

Control computer 130's ability to interpret the human operator's intent before complying with it offers many opportunities for sophisticated interaction between the computer 130 and the human operator. For example, the computer 130 may refuse to comply with the operator's intent when to do so would cause a collision between cobot 10 and an object in the workspace that is known to computer 130.

When the human operator moves cobot 10 into contact with virtual wall VW, control computer 130 switches to "path mode." In path mode, cobot 10 confines its motion to a particular path or curve through the two dimensional workspace. The path to be followed is defined in software, and thus may be arbitrarily shaped and curved. Because it is software controlled, the path may be modified easily, even moment to moment, with no change in hardware. Computer 130 confines the operator's motion to the defined path by steering wheel 20 such that its rolling direction is tangent to the defined path at every moment. Thus, the human operator has control over the speed of cobot 10 along the path, while computer 130 has control over the shape of the path.

During contact with the virtual wall, forces applied by the human operator that would tend to push cobot 10 into the virtual wall are ignored. As a result, it appears to the human operator that cobot 10 has encountered a physical wall which blocks further motion beyond it. At the same time, computer 130 continues to monitor the force applied by the human operator to cobot 10. If the operator applies a force directed away from the virtual wall, computer 130 reverts to free mode. This allows the operator to pull cobot 10 off the virtual wall when he wishes to do so. Such behavior is known as a "unilateral constraint," because cobot 10 resists forces applied to the surface in one direction, while complying with forces applied in the opposite direction.

Virtual surfaces offer tremendous opportunities for both ergonomics and productivity. For example, virtual surfaces can be set up to protect obstacles in the workspace by causing a payload attached to cobot 10 to veer off before colliding with an obstacle. Virtual surfaces can also facilitate motion of a payload along a defined path. This advantage can be understood by analogy to the use of a straightedge or a compass in drawing. Drawing of a straight line or an arc of a circle freehand is difficult and unwieldy. However, with a straightedge or compass, the same task is much more easy and sure. In this case, reducing the drawer's degree of freedom from two one is the source of the advantage. Similarly, cobot 10 may be moved much more readily along a particular path by allowing a human operator to push cobot 10 along a defined virtual surface than by requiring the human operator to move cobot 10 along the same path in free mode.

Virtual surfaces can also be used to create a guiding corridor around an optimal path for a payload attached to cobot 10 to help ease and speed a human operator's task. In such case, cobot 10 will operate in free mode inside the corridor, and will switch to path mode at the walls of the corridor. As a result, the operator has freedom to move the cobot 10 at will down the middle of the corridor, and may also intentionally push cobot 10 against the virtual wall of the corridor in order to use it as a smooth and quick guiding surface in moving cobot 10 to its destination. This type of system is particularly advantageous in assembly tasks, where it is beneficial to provide the operator a great deal of freedom far from the assembly location, but only a narrow area of freedom at the assembly location. Thus, the corridor can be defined to narrow down as the operator approaches the assembly location, in order to form a "virtual funnel" that brings the payload attached to cobot 10 smoothly and easily to the correct location for assembly.

The specific operation of cobot 10 will now be described in more detail in conjunction with the flow charts of FIGS. 4–5. Operation of cobot 10 in free mode is illustrated in FIG. 4. First, configuration sensor 125 measures the current configuration of cobot 10 (step S10). In this embodiment, the configuration includes the position of cobot 10 in the workspace. Next, computer 130 uses this information to determine whether cobot 10 has encountered a virtual wall in the workspace (step S20). If cobot 10 has encountered a virtual wall, computer 130 switches the cobot to path mode, which is illustrated in more detail in FIG. 5 (step S30). If cobot 10 has not encountered a virtual wall, intent sensor 100 then measures the force applied by the human operator to handle 60 (step S40). Next, speed sensor 102 measures the rotational velocity of wheel 20 (step S50). Heading sensor 110 then measures the steering angle of wheel 20 (step S60). These measurements are all received by control computer 130, which uses them to compute a new steering angular velocity of steering shaft 55, which in turn will control the steering angle of wheel 20 (step S70). Control computer 130 then actuates steering motor 50 to move shaft 55 at the new steering angular velocity, which steers wheel 20 into the desired new position to move cobot 10 in the direction of the force applied by the human operator (step S80). Thus, in free mode, wheel 20 appears to the operator to be entirely free to move in the planar workspace in response to forces applied by the operator to handle 60.

When cobot 10 encounters a virtual wall, it switches to path mode operation, which is illustrated in FIGS. 5. First, intent sensor 100 measures the force applied by the human operator to handle 60 (step S100). Computer 130 then determines whether the force applied by the operator is in a direction away from the virtual wall or a direction into the virtual wall (step S110). If the force applied is in a direction away from the virtual wall, indicating that the operator is intending to move cobot 10 away from the virtual wall, computer 130 switches to free mode (step S120), which is illustrated in FIG. 3. If the force applied is in a direction into the virtual wall, computer 130 ignores this measurement. Cobot 10 then measures the steering angle and velocity of wheel 20 (steps S130–S140), and measures the configuration of cobot 10 (step S150), including its position. Computer 130 uses these measurements to determine whether cobot 10 has erroneously veered from the path defined by virtual wall VW due to the effect of the skidding force on wheel 20 in response to forces applied by the operator, and computes a heading error based on this determination (step S160). Computer 130 then uses this data to compute a new steering angular velocity of shaft 55, which in turn steers wheel 20 along the desired path defined by virtual wall VW (step S170). Control computer 130 then uses this new steering angular velocity to actuate steering motor 50 to steer wheel 20 into the desired new position to move cobot 10 in a direction tangent to virtual wall VW in response to the forces applied by the human operator (step S180). Accordingly, the operator feels as if cobot 10 has hit a wall, but is free to move cobot 10 along the surface of the wall or away from the wall.

The control logic and control laws that are used within the control computer 130 to drive steering motor 50 in such a way as to implement virtual surfaces will be described in more detail below. This discussion is also illustrative of the control logic and laws which may be used for more complex cobots with higher workspace dimensions.

As shown in FIGS. 4–5, a cycle of the control loop begins with sensor readings. These readings produce measures of the cobot configuration (x and y coordinates, which we will represent as a 2×1 vector $R=[xy]^T$); cobot heading (steering angle, $\theta_s$); cobot speed ($u=(x^2+y^2)^{1/2}=r_w\omega_w$) (where $r_w$ is the wheel radius and $\omega_w$ is the wheel rolling angular velocity); and operator intent ($F=[f_x f_y]^T$).

Subsequently, computations are performed to determine whether the control should enter path mode or free mode. Path mode will result only if it is simultaneously true that: (1) the cobot configuration is on or within a virtual surface, and (2) the operator's intent is not to pull the cobot away from the surface. If the cobot is not on or within a surface, or is on or within a virtual surface but being pulled away from the surface, free mode will result.

These conditions may be represented mathematically as follows. Any virtual surface can be represented by a function of configuration, $C(x,y)=0$. Moreover, this function can be set up such that configurations outside the surface yield $C(x,y)>0$, while configurations inside the surface yield $C(x,y)<0$.

As an illustrative example, consider a straight wall defined by a point on the wall $P=[p_x p_y]^T$ and a unit normal $N=[n_x n_y]^T$ pointing perpendicularly away from the interior of the wall. A suitable function $C(x,y)$ is:

$$C(x,y)=(R-P)N=(x-p_x)n_x+(y-p_y)n_y$$

Associated with any such function $C(x,y)$ is a gradient which defines an outward-pointing surface normal.

$$\hat{n} = \frac{\partial C}{\partial x}\hat{i} + \frac{\partial C}{\partial y}\hat{j}$$

where $\hat{i}$ is a unit vector in the x direction and $\hat{j}$ is a unit vector in the y direction, is a unit vector pointing away from the surface at each point (x,y) that is on the surface. It is easily verified that, in the example above, n=N.

It is possible to check if the user-applied force is pointing into or out of the surface by forming a dot product of this force and the surface normal. The condition for an inward-pointing force is:

$$F \cdot n < 0$$

If the results of these computations indicate that the controller should enter free mode, it becomes necessary to compute steering motor torques that are responsive to the operator's intent. One way to arrive at a suitable control law is to think of the cobot as a point mass. For a point mass, the acceleration and force vectors are collinear and in fixed proportion. The implication for a single wheel device is that, not only must forces in wheel direction, $F_{parallel}$ produce acceleration of $a=F_{parallels}/M$, but forces normal to the wheel, $F_{perp}$ must similarly produce accelerations of $a=F_{perps}/M$, where M is the mass. If the single-wheel cobot is to behave like a point mass, then it must be steered in such a way as to produce the proper acceleration in response to normal forces. A simple kinematic analysis shows that a wheel traveling at a speed u with a steering velocity $\omega_s$ has an instantaneous normal acceleration of $a=u\omega_s$. Thus, a prescription for the steering velocity which would result in point mass-like behavior would be given by:

$$\omega_s = \frac{F_{perp}}{uM}$$

In practice, this equation must be modified to prevent overflow, excessively large control signals and instability at low speeds. Further, it is often necessary to issue a torque command rather than a velocity command to the motor. Velocity control can be achieved by closed loop control. For instance, the following equation is a proportional controller that will, in practice, keep the steering velocity close to the commanded steering velocity, if the gain K is properly tuned:

$$\tau = K(\omega^{rummwal}-\omega_s)$$

Using this relation, a practical form of the free mode control law is:

$$\tau = \frac{k_1 F_{perp}}{u + \varepsilon \text{sign}(u)} - K\omega_s$$

where $k_1=K/M$, and $\varepsilon$ is a small value that keeps the denominator term from approaching zero ($\varepsilon$ is of the same order as the speed measurement resolution). Using the relation $u=r_w\omega_w$, this control equation may also be written:

$$\tau = \frac{k_2 F_{perp}}{\omega_w + \varepsilon \text{sign}(\omega_w)} - K\omega_s$$

where $k_2=k_1/r_w$.

If, on the other hand, the cobot is determined to be in path mode, it becomes necessary to compute steering motor torques that guide the cobot along the virtual surface. One approach to this is to implement a closed loop controller that attempts to minimize the error between the cobot heading and the tangent to the surface. If this error is $\theta_c$, then a suitable controller is:

$$\tau=k_{pd}(k_d\theta_c+\theta_c)$$

where $k_{pd}$ and $k_\alpha$ are control gains that adjusted for best performance. Another approach is to implement a controller that sets the steering ($\omega_s$) according to the radius of curvature of the surface, $\rho$, and the cobot speed, u. Straightforward kinematic analysis shows that the ideal steering speed is $\omega_s=u/\rho$. A controller based on this approach produces very smooth steering, but will not correct for any errors that inevitably occur. In practice, therefore, it is important to augment the controller to account for both errors in heading ($\theta_c$) and in configuration ($\delta_c$—the amount of surface penetration). A suitable controller is then:

$$\tau = K\left(\frac{u}{\rho} - k_\delta \delta_c - k_c \theta_c - \omega_s\right)$$

Figure 6:
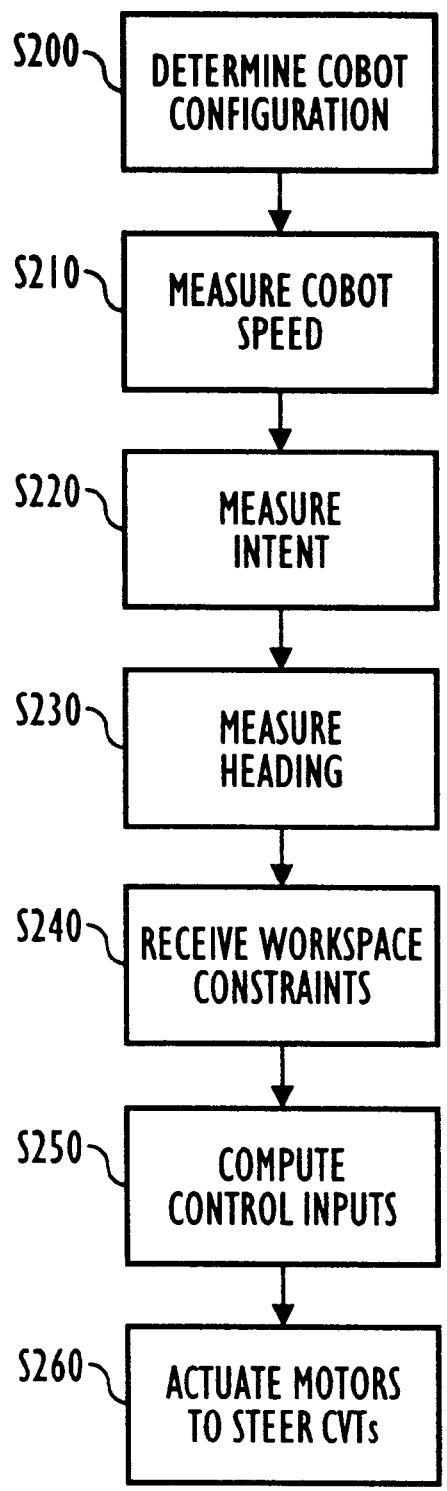
FIG. 6 is a flow chart illustrating the operation of the embodiment of FIG. 2(a)–(c) in general mode.

Although FIGS. 4 and 5 illustrate cobot 10 as operating in either free mode or path mode, cobots may also be programmed to operate in a more flexible manner known as "general mode." Operation of a cobot in general mode is illustrated in FIG. 6. First, a configuration sensor measures the current configuration of the cobot (step S200). The information sensed by the configuration sensor includes a complete description of where the cobot is in space, and will generally include both position and orientation information. Next, a speed sensor measures the current speed of the cobot (step S210), and an intent sensor measures the force applied by a human operator to the cobot (step S220). A heading sensor then measures the current heading of the cobot by determining the current orientation of the CVT(s) (step S230). A control computer then receives data defining workspace constraints, such as virtual walls, paths, force fields, or other defined parameters of the cobot's workspace (step S240). The control computer then computes control inputs that will be used to control the CVT(s) (step S250), and then actuates steering motors to steer the CVT(s) in the proper direction depending on the operator's intent and the workspace constraints (step S260).

Figure 7:
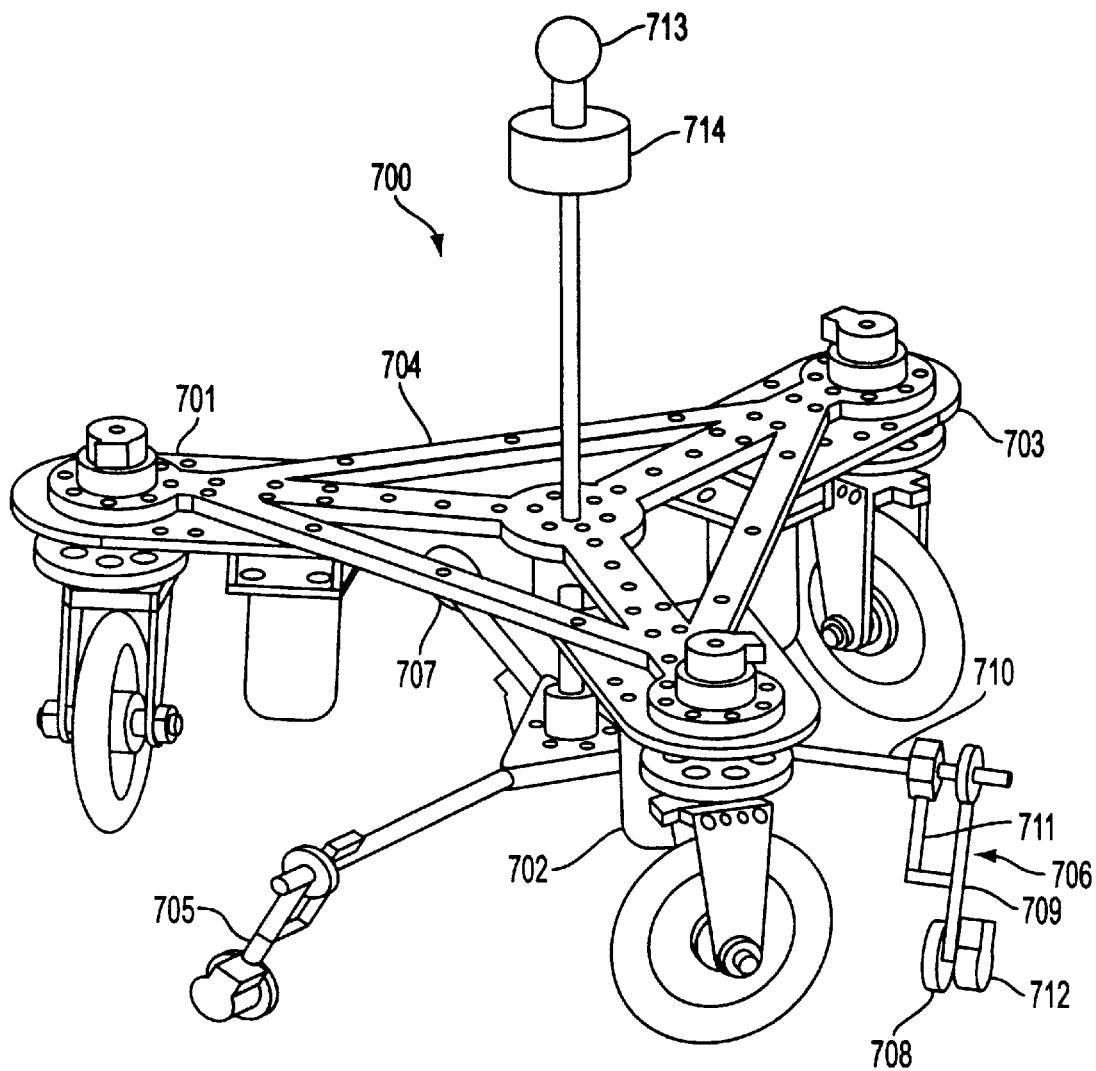
FIG. 7 is a diagram of a three-wheel cobot according to another embodiment of the present invention.

FIG. 7 illustrates another embodiment of the cobot architecture of FIG. 1, a three-wheeled cobot 700. As shown in FIG. 7, cobot 700 includes three steered wheel assemblies 701–703 rigidly attached to a common frame 704. Wheel assemblies 701–703 are disposed so that they roll on a common plane which forms the workspace of cobot 700. Each of wheel assemblies may be of the type described earlier in FIGS. 2(a)–(c), or they may be of a simpler construction as shown in FIG. 7. Cobot 700 includes a handle 713 that can be pushed or twisted by a human operator, and an intent sensor 714 which measures the force applied to handle 713. Cobot 700 also includes a control computer (not shown) which may be mounted to platform 704 or connected to cobot 700 in some other suitable fashion.

In the embodiment shown in FIG. 7, the speed and configuration of cobot 700 are measured by a sensor system comprising three identical glide wheel assemblies 705–707. As shown in FIG. 7, glide wheel assembly 706 includes a low-friction wheel 708 mounted via bearings to a rocker arm 709. Rocker arm 709 rotates on a bushing about support post 710, which is rigidly attached to platform 704. Leaf spring 711 pushes wheel 708 against the planar workspace. Optical encoder 712 also measures the rotations of wheel 708. Accordingly, encoder 712 measures rolling motions of the wheel 708 perpendicular to its axle, but does not measure any sliding motion of wheel 708 in a direction parallel to its axle. Glide wheel assemblies 705 and 707 have the same construction as glide wheel assembly 706, and thus will not be described in further detail. Measurements taken from glide wheel assemblies 705–707, along with a measurement of the heading of cobot 700 taken from the three steering angles of the wheels, permit the determination of the configuration of cobot 700. Measurements taken from the glide wheel assemblies 705–707 may also be used to estimate the speed of cobot 700 along the available heading.

Cobot 700 has a three-dimensional configuration space, or, in other words, cobot 700 can move in three possible dimensions. Two of these dimensions are the x and y displacements of a cobot relative to an arbitrary origin, like the one-wheeled cobot of FIGS. 2(a)–(c). The other dimension is the angular displacement $\theta$ of cobot 700 about a vertical axis. Thus, cobot 700 can guide both translational and rotational movement in response to forces applied by a human operator. Translational motion is permitted only when all three axles of the wheels of cobot 700 are parallel. Rotational motion occurs where imaginary lines extending from and coaxial with the axles of the three wheels of cobot 700 intersect at a common point, in which case cobot 700 will rotate about that point. This capability of cobot 700 for rotational as well as translational motion can be very important for many applications, for example, to help achieve proper orientation of a payload for a particular assembly operation.

Like the one-wheeled cobot of FIGS. 2(a)–(c), cobot 700 has only one instantaneous degree of freedom. In other words, the ratios of x, y, and $\theta$ velocities are completely determined by the steering of the wheels, and once these steering angles are set, only one direction of motion of cobot 700 at any instant will be possible. As was the case of the single-wheeled cobot of FIGS. 2(a)–(c), however, cobot 700 can give the human operator the appearance of three instantaneous degrees of freedom due to its computer control. The control computer will steer the wheels to permit whatever combination of translation and rotation is measured by intent sensor 714.

Cobot 700 is an example of a cobot that is "redundant." Referring back to the architecture of FIG. 1, cobot 700 includes three available joint motions (x, y, and $\theta$) and three CVTs, even though two are only strictly necessary to allow three available motions. This can be illustrated by the fact that, for most combinations of steering angles, only two wheels are required to establish a single allowable direction of motion. In such cases, the third wheel is redundant, and must be steered in a manner that is consistent with the other two if motion is to be allowed at all.

Cobots may be based on a variety of CVT elements other than wheels. One example is a spherical CVT. Unlike a wheel, which couples together translational velocities of motion, a spherical CVT couples angular velocities.

Figure 8:
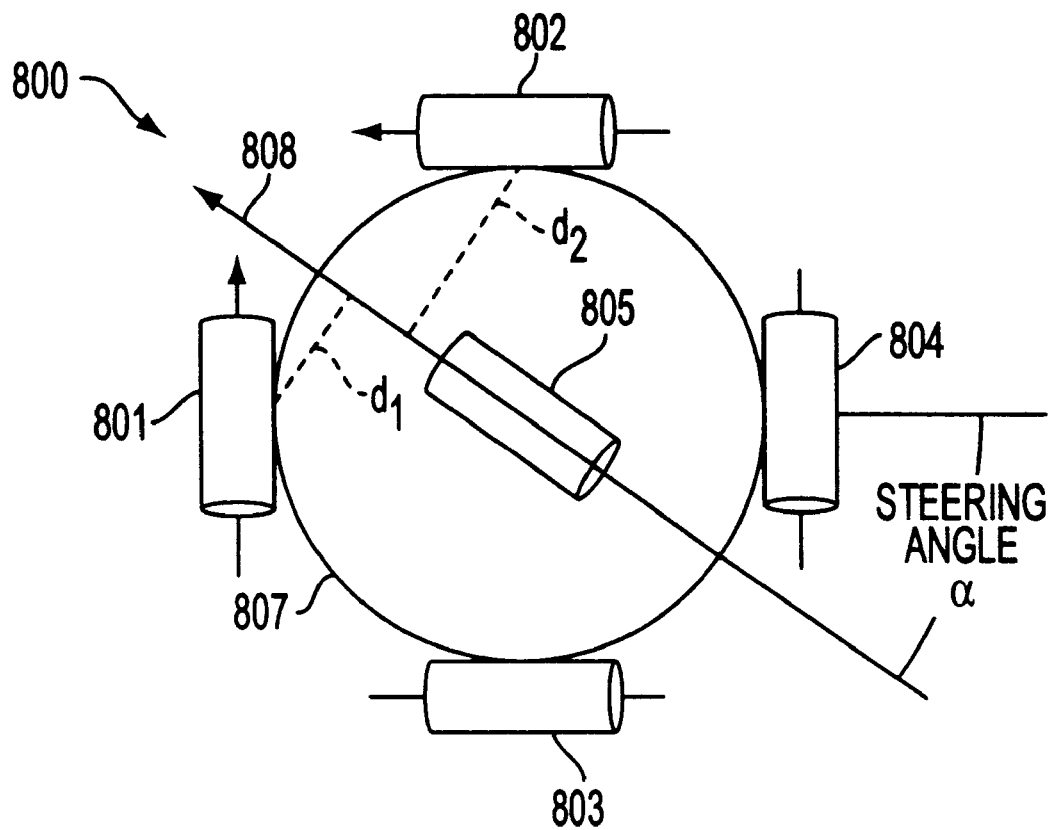
FIG. 8 is a diagram of a spherical CVT that can be used in conjunction with the present invention.

One embodiment of a spherical CVT 800 is shown in FIG. 8. CVT 800 is known as a cubic CVT because it consists of six rollers 801–806 pressed into rolling contact with a sphere 807. In FIG. 8, roller 806 is underneath sphere 807 and is not visible. Rollers 801–806 consist of drive rollers 801 and 802, which control the angular motion of the cobot which is to be constrained by CVT 800. Rollers 801 and 802 are coupled to the motion of some external device, such as the links of a cobot, and are not free to turn on their axles. Rollers 803 and 804 are pressure rollers which act as idlers, and whose only function is to maintain pressure on sphere 807 so that none of the other rollers slip. Rollers 805 and 806 are steering rollers that can be adjusted in order to change the ratio of angular velocities of rollers 801 and 802. Rollers 803–806 are not driven and are free to turn on their axles.

Axles of rollers 805 and 806 are not fixed, but rather are adjustable by a mechanism which for clarity is not shown in FIG. 8. In FIG. 8, the axles of rollers 805 and 806 are shown at an arbitrary steering angle of $\alpha$. The axles of steering rollers 805–806 always remain parallel to each other regardless of their steering angle.

For any given angle of steering rollers 805–806, the sphere 807 is constrained to rotate about a single axis. For example, when steering rollers 805–806 are set to angle $\alpha$, sphere 807 is constrained to rotate about axis 808. If steering rollers 805–806 are adjusted to another angle, the axis of rotation 808 will change correspondingly. For any given axis of rotation 808, the point of contact of each of drive rollers 801–802 with sphere 807 traces out a circle of a particular diameter on sphere 807. For example, as shown in FIG. 8, when steering rollers 805–806 are set to angle α, drive roller 801 traces out a circle with diameter d1 and drive roller 802 traces out a circle with a diameter d2, which is larger than d1. As a result, for each revolution of sphere 807 about axis 808, roller 801 makes fewer rotations and has a lower angular velocity than roller 802. Thus, the angular velocities of roller 801 and roller 802 are constrained to a ratio determined by steering rollers 805–806.

By adjusting steering rollers 805–806 to various angles, the ratio of angular velocities of rollers 801–802 may be adjusted to any desired ratio. In general, if ω1 is taken to be the angular velocity of roller 801, ω2 is taken to be the angular velocity of roller 802, and α is taken to be the steering angle of rollers 805–806, this ratio is determined as:

$$\omega 1/\omega 2 = \tan(\alpha)$$

Thus, the manner in which the spherical CVT 800 relates the angular velocities of rollers 801 and 802 is analogous to the manner in which a steered wheel relates x and y translational velocities. Both CVTs are examples of steered nonholonomic transmissions.

A variety of different types of cobots can be based on one or more spherical CVTs. One type of cobot based on a spherical CVT is an overhead rail cobot, based on the use of overhead rail assist systems of a type that are generally known in the art. Overhead rail systems are popular in industry, and are used frequently to allow a human operator to move a payload suspended from the overhead rail device, while sparing the operator from the burden of supporting the weight of the payload.

Figure 9:
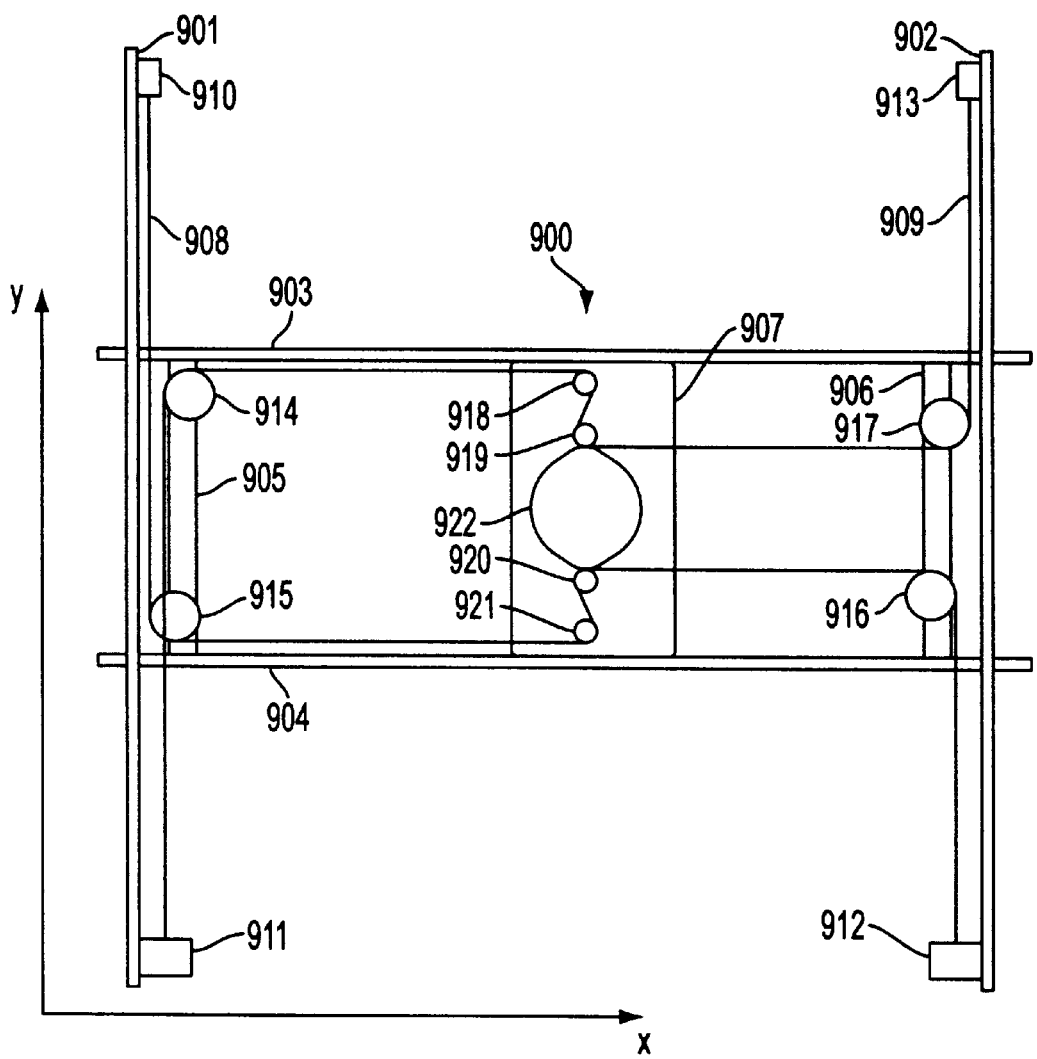
FIG. 9 is a plan view of an overhead rail cobot according to another embodiment of the present invention.
Figure 10:
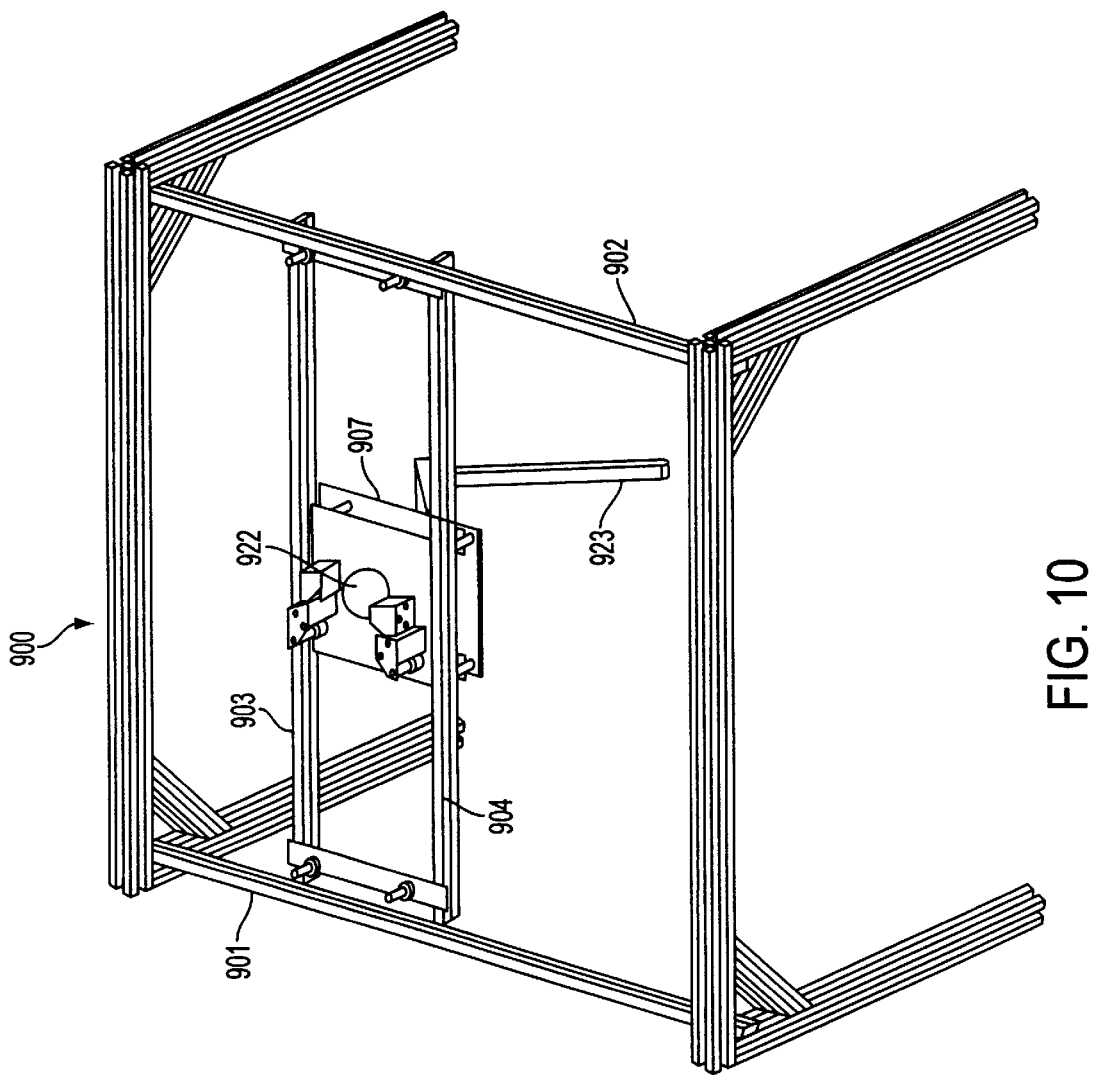
FIG. 10 is another view of the overhead rail cobot of FIG. 9.

One embodiment of an overhead rail cobot is illustrated in FIGS. 9–11. FIG. 9 is a plan view of an overhead rail cobot system 900. Cobot 900 comprises fixed long rails 901 and 902, which are suspended above a work area. Cobot 900 also includes bridge rails 903 and 904, which are positioned slightly below long rails 901 and 902 and are rigidly held together by bridge rail connectors 905 and 906, which maintain a fixed distance between bridge rails 903 and 904. Cobot 900 also includes a platform 907 which is slidably mounted to bridge rails 903 and 904 such that it slides in the x-direction along the bridge rails. Bridge rails 903 and 904 are slidably mounted on long rails 901 and 902 such that the entire bridge rail assembly can slide in the y-direction along long rails 901 and 902.

The x and y motions of the platform are coupled together by a CVT element. In other embodiments, additional CVTs can be added depending on the requirements of the particular system. The CVT 1322 used in FIGS. 9 will be described in more detail below in connection with FIGS. 11(a)–(b).

Cobot 900 also includes two belts 908 and 909. Belt 908 is connected to a tensioning device 910, runs along rail 901, and makes a 90 degree turn around idler pulley 915, which is rotatably attached to bridge rail connector 905. Belt 908 traverses the bridge rail assembly, making turns around pulleys 920 and 921. Pulley 920 is attached to the spherical CVT 922, and pulley 921 is rotatably attached to platform 907 and serves as an idler. Belt 908 then makes another 90 degree turn around idler wheel 916, which is rotatably attached to bridge rail connector 906, and continues along long rail 902, terminating at a fixed point 912. Belt 909 makes the opposite traversal from tensioning device 913 to fixed point 911, engaging pulley 920 attached to CVT 922, and idler pulley 921, along the way. As further illustrated in FIG. 10, cobot 900 also includes a downwardly extending arm 923 which can be attached to a payload to be moved by a human operator. Cobot 900 further includes a control computer (not shown) which may be mounted to cobot 900 or connected to cobot 900 in any suitable fashion.

Operation of cobot 900 is as follows. In this embodiment, a human operator applies a driving force to cobot 900 by moving a payload attached to arm 923. These forces in turn act on platform 907. The directional motion of the platform is controlled by the ratio of speeds of pulleys 919 and 920, which is set by CVT element 922. For instance, when CVT element 922 is set to permit a 1:1 ratio of pulley speeds, platform 907 will be constrained to move in the positive or negative y direction. When platform 907 moves in the positive y direction, for example, because the ends of belt 908 are fixed, pulley 916 must rotate clockwise, as must pulley 920. The speed of rotation of pulley 920 will be the speed of platform 907 divided by the radius of pulley 920. Likewise, because the ends of belt 909 are fixed, pulleys 917 and 919 must rotate clockwise. The speed of rotation of pulley 919 will be the speed of platform 907 divided by the radius of pulley 919, which, in this embodiment, is the same as the radius of pulley 920. It is evident, therefore, that positive y motion results in identical speeds for pulleys 919 and 920, which is consistent with the setting of CVT element 922.

At this particular instant in time, motion in the x direction is not allowed because it would result in clockwise rotation of pulley 919 and counterclockwise rotation of pulley 920, which would be inconsistent with the setting of CVT element 922. The ratio of speeds of pulleys 919 and 920, as determined by CVT element 922 is, however, continuously adjustable. For example, if CVT element 922 is then set to permit a 1:−1 ration of pulley speeds, platform 907 will be constrained to move in the positive or negative x direction. Thus, by appropriate adjustment of CVT element 922, platform 907 can be constrained to move in any given direction.

Figure 11A:
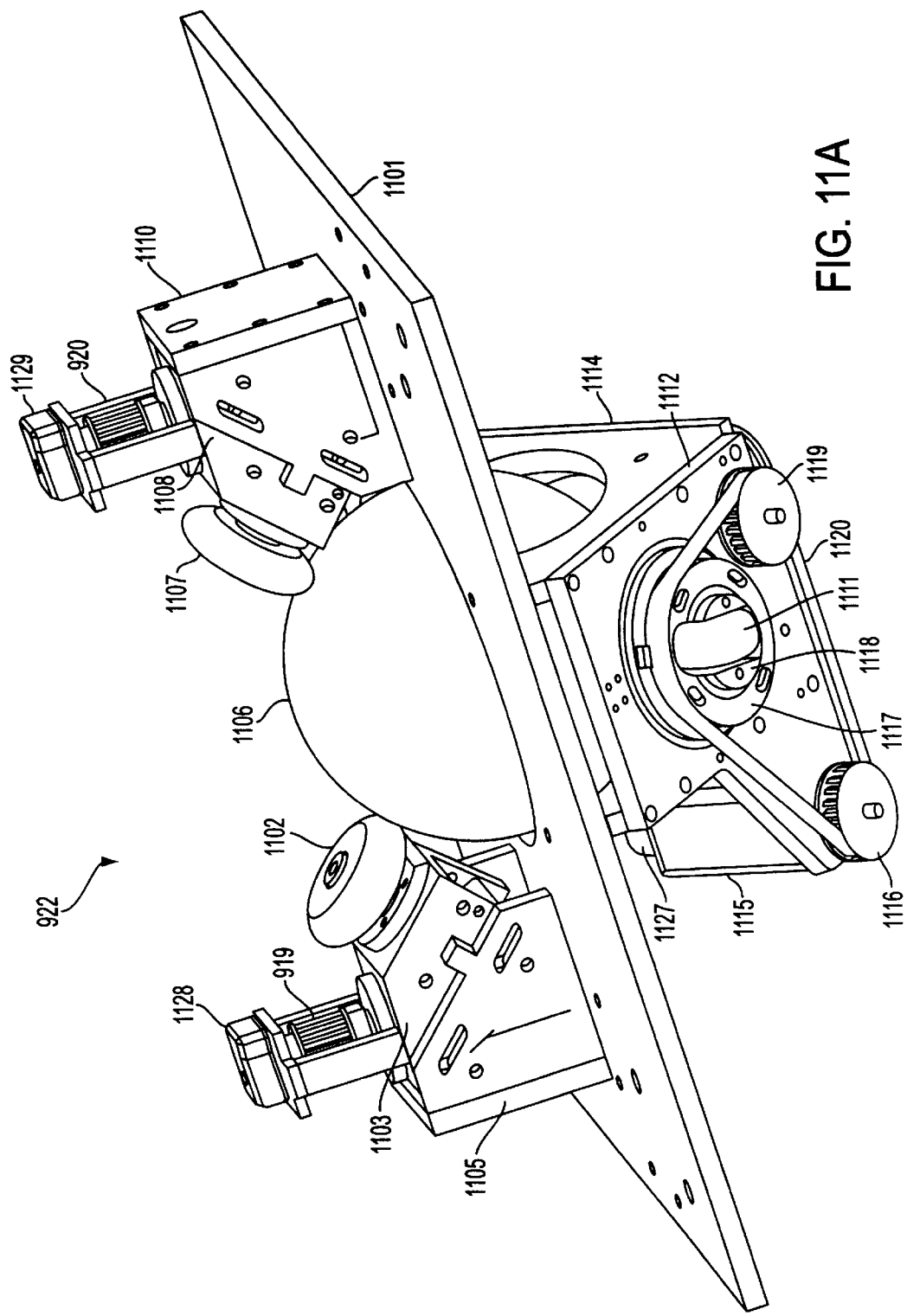
FIGS. 11(a)–(b) are different views of a tetrahedral CVT that can be used in the overhead rail cobot of FIG. 9.
Figure 11B:
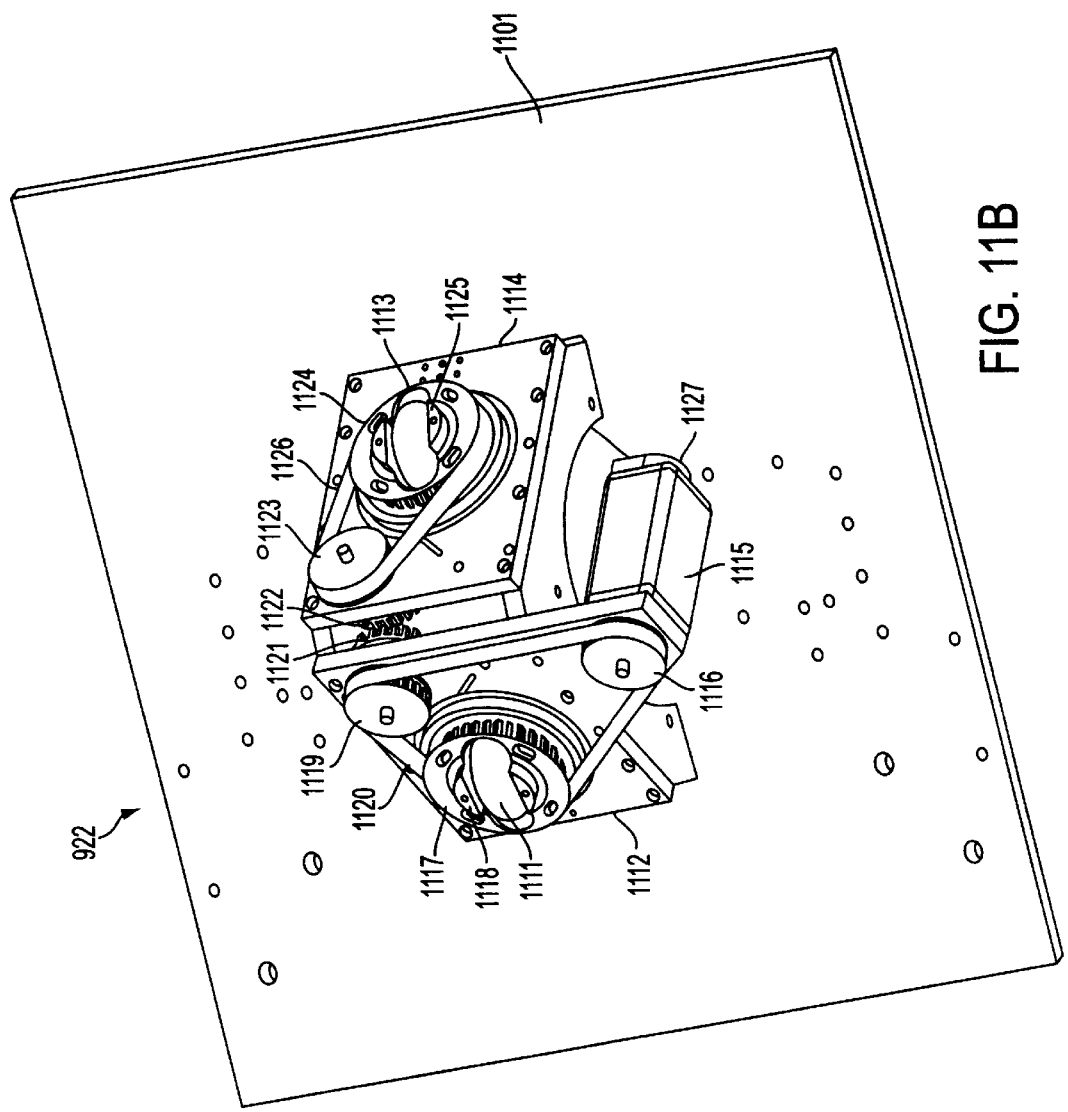

FIGS. 11(a)–(b) show two views of the spherical CVT element 922 used in FIGS. 9–10. This particular embodiment of a spherical CVT is known as a "tetrahedral" CVT because it uses four rollers rather than six. This reduction in the number of rollers reduces the cost and simplifies the manufacturing of the tetrahedral CVT as compared to the cubic CVT of FIG. 8.

As shown in FIGS. 11(a)–(b), CVT 922 includes four rollers, 1102, 1107, 1111, and 1113, which are mounted to main support platform 1101. Rollers 1102 and 1107 function as drive rollers and rollers 1111 and 1113 function as steering rollers. Unlike the spherical CVT, tetrahedral CVT 922 has no pressure rollers. Steering rollers 1111 and 1113 are located 90 degrees apart from each other, and disposed in a tetrahedral configuration with respect to drive rollers 1102 and 1107. This embodiment is not limited to steering rollers at angles of 90 degrees, and other angles may also be used depending upon the requirements of the particular system.

Drive roller 1102 is rotatably mounted in housing 1103, and is coupled to pulley 919 (see FIG. 9) via a 45 degree mitre gear pair of known type, which is also mounted rotatably in housing 1103. Housing 1103 is adjustably mounted in frame 1105, such that it can be moved a small distance toward or away from the center of sphere 1106 in order to accommodate different drive and steering roller diameters or different sphere diameters. Frame 1105 is rigidly mounted to platform 1101. The support assembly for drive roller 1107, including housing 1108, pulley 920, and frame 1110, is identical to that for drive roller 1102. The axles of drive rollers 1102 and 1107 lie in a common plane, and are at an angle of 90 degrees in this embodiment with respect to one another. Angles other than 90 degrees may also be employed in different embodiments.

Steering roller 1111 is rotatably mounted in plate 1112, which is rigidly attached to platform 1101. Similarly, steering roller 1113 is rotatably mounted in plate 1114, which is also rigidly attached to platform 1101. CVT 922 also include a motor 1115 which steers rollers 1111 and 1113 as described below. Pulley 1116 is rigidly attached to the shaft of motor 1116 such that it can be rotated by motor 1116. Pulley 1117 is coupled to pulley 1116 via a belt 1120, and is rigidly attached to housing 1118. Steering roller 1111 is mounted adjustably in housing 1118, and is free to rotate about its axle. Steering roller 1111 is mounted such that its axle is forced to lie parallel to the surface of plate 1112, but that it can be moved a small distance toward or away from the center of sphere 1106 in order to accommodate different drive and steering roller diameters or different sphere diameters. Pulley 1119 is also coupled to pulleys 1116 and 1117 via belt 1120, and is rotatably mounted on plate 1112. Thus, belt 1120 couples pulleys 1116, 1117 and 1119, permitting motor 1115 to steer steering roller 1111 and pulley 1119.

Pulley 1119 is coupled to pulley 1123 via bevel gears 1121 and 1122, which are of a conventional type. Pulley 1123 is then coupled to pulley 1124 via a belt 1126. Pulley 1124 is mounted to housing 1125 and steering roller 1113 in a manner identical to pulley 1117. This construction allows motor 1115 to steer roller 1113 to an angle corresponding to that of roller 1111. The orientation of steering rollers 1111 and 1113 is such that if plates 1112 and 1114 were closed together like the covers of a book, the axles of rollers 1111 and 1113 would be parallel.

CVT 922 also includes optical encoders 1127–1129. Optical encoder 1127 measures the steering angle of rollers 1111 and 1113. Optical encoders 1128 and 1129 measure the shaft angles of drive rollers 1102 and 1107, respectively. Encoders 1128–1129 can be used to measure the distance that drive rollers 1102 and 1107 have moved along the rails of cobot 900, and therefore sense the configuration of CVT 922 with respect to the overhead rail system.

The relationship between the steering angle of steering rollers 1111 and 1113 and the drive wheel angular velocities is given by the following equation:

$$\omega 1 / \omega 2 = \left(\sin(\alpha) - \sqrt{2}\cos(\alpha)\right) / \left(\sin(\alpha) + \sqrt{2}\cos(\alpha)\right)$$

Where ω1 is the angular velocity of drive roller 1102, ω2 is the angular velocity of drive roller 1107, and α is the steering angle of steering rollers 1111 and 1113. The steering angle α is defined to be zero when the axles of steering rollers 1111 and 1113 are both parallel to platform 1101.

Figure 12:
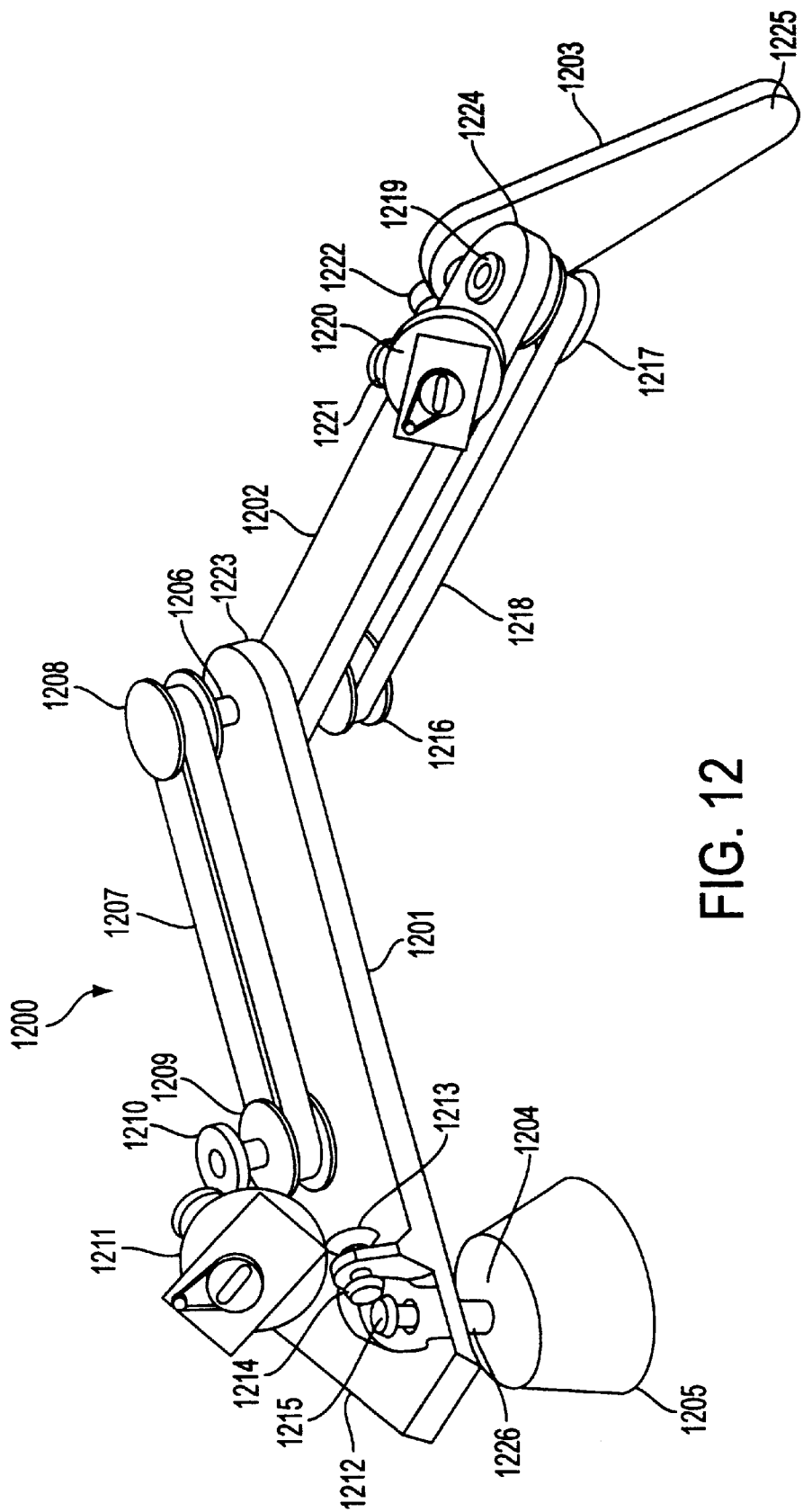
FIG. 12 is a diagram of an articulated arm cobot according to another embodiment of the present invention.

FIG. 12 illustrates an embodiment of another type of cobot based on the spherical CVT—the articulated arm cobot. In this embodiment, the basic scheme for developing an articulated linkage into a cobot is to couple the joints of the linkage through a network of spherical CVTs. In the embodiment shown in FIG. 12, an articulated arm cobot 1200 includes three links 1201, 1202 and 1203 coupled via two tetrahedral CVTs 1211 and 1220. Link 1201 rotates about shaft 1204, which is fixed to base 1205. Link 1202 rotates about shaft 1206, which is fixed to link 1201. Link 1203 is rotatably connected to link 1202.

The rotation of link 1202 is coupled to the rotation of link 1201 via pulleys 1208 and 1209, and CVT 1211. Pulley 1208 is fixed on shaft 1206, and pulley 1209 is rotatably fixed upon link 1201. Pulleys 1208 and 1209 are coupled by belt 1207. A drive roller 1210 is fixed to pulley 1209, and presses against the sphere of tetrahedral CVT 1211. CVT 1211 is of the type illustrated in FIG. 8, with the connections from the drive wheels altered to be suitable for use in the articulated arm embodiment of FIG. 12. CVT 1211 includes a main mounting platform 1212, which is rigidly attached to link 1201. In FIG. 12, platform 1212 has been cut away to reveal the bevel gears 1214 and 1215 underneath it. Drive roller 1213 of CVT 1211 presses against the sphere of CVT 1211. and is rotatably fixed to link 1201. Drive roller 1213 is coupled via bevel gears 1214 and 1215 to shaft 1204. This arrangement has the effect of coupling the angular velocity of link 1202 to the angular velocity of link 1201. The ratio of these angular velocities is determined by CVT 1211.

Similarly, the rotation of link 1203 is coupled to the rotation of link 1202 by pulley 1216, pulley 1217, and tetrahedral CVT 1220. Pulley 1216 is also fixed to shaft 1206, and pulley 1217 is rotatably fixed to link 1202. Pulleys 1216 and 1217 are coupled together by belt 1218. Pulley 1217 is also connected to drive roller 1219, which presses against the sphere of CVT 1220. CVT 1220 includes a main mounting platform 1221 that is rigidly attached to link 1202. CVT 1220 also includes drive roller 1222 which is rotatably fixed in link 1202 and presses against the sphere of CVT 1220. Drive roller 1222 is coupled to the shaft of link 1203 by a standard bevel gear arrangement similar to that coupling roller 1213 to shaft 1204. This structure has the effect of coupling the angular velocity of link 1203 to the angular velocity of link 1202. Cobot 1200 also includes a control computer (not shown) for controlling the steering of CVTs 1211 and 1220.

The ratio of angular velocities between links 1201, 1202 and 1203 is specified by CVTs 1211 and 1220. As a result, the three translational velocities of links 1201–1203 are coupled at the tip of link 1203. In other words, CVTs 1211 and 1220 determine and constrain the instantaneous ratio of x velocity to y velocity to z velocity. Thus, cobot 1200 has three degrees of freedom, because the tip of link 1203 can be moved anywhere within a three dimensional workspace. Cobot 1200 has, however, only a single instantaneous degree of freedom because at any given instant, it is constraint by CVTs 1211 and 1220 to move in a single direction, like the one-wheeled cobot of FIGS. 2(a)–(c).

Cobot 1200 also includes configuration sensors 1223, 1224, and 1226 mounted at the joint of links 1201 and 1202, at the joint of links 1202 and 1203, and at the joint of link 1201 and base 1205, respectively. Configuration sensors 1223–1224 can also measure the speed of cobot 1200 by differentiating the configuration data. Cobot 1200 further includes a force sensor 1225 incorporated into link 1203, which measures the force applied by a human operator to a handle attached to link 1403.

Figure 13:
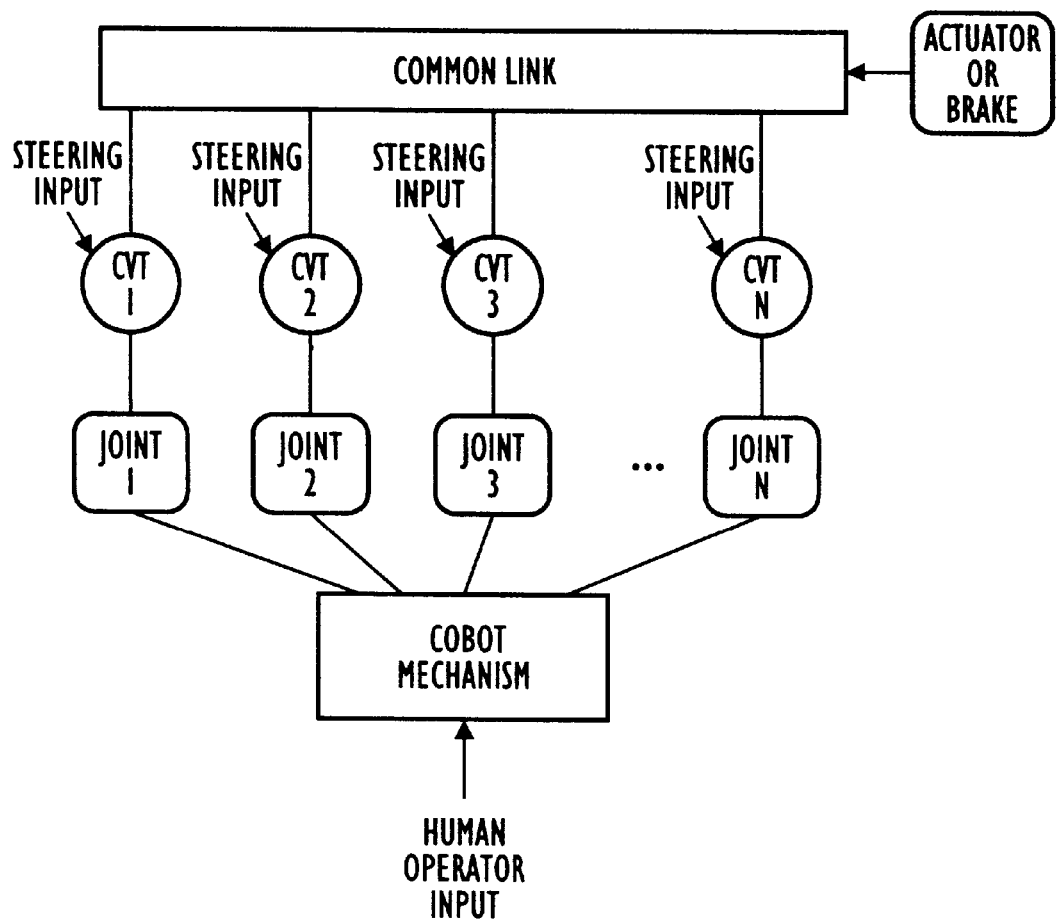
FIG. 13 is a diagram of another cobot architecture according to yet another embodiment of the present invention.

All of the cobots described thus far are based on the architecture of FIG. 1. Another architecture which can be used to implement a variety of cobots is illustrated in FIG. 13. In the architecture shown in FIG. 13, all of the CVTs connect to a common link. This link may take a number of different forms, such as a rotating shaft, for example. In this architecture, one CVT is used for each available joint motion. As in the architecture of FIG. 1, all of the CVTs are mounted to a cobot mechanism that receives an input from a human operator.

The architecture of FIG. 13 has a number of advantages. For example, an actuator or brake can be connected to the common link in order to impart driving or braking forces to the cobot. As a result, the common link can be moved or braked by either the force applied by a human operator or the actuator/brake, or some combination of both. As described in more detail below, this can assist an operator in ways such as lifting loads against gravity, allowing an operator to overcome frictional or inertial resistance in moving a large load, or braking a load in order to slow it down when it reaches a particular location.

FIGS. 14–17 all illustrate cobot embodiments based on the architecture of FIG. 13. Like the architecture of FIG. 1, cobots based on the architecture of FIG. 13 can take many forms, and can use a variety of different CVTs, such as wheels and spherical CVTs.

Figure 14:
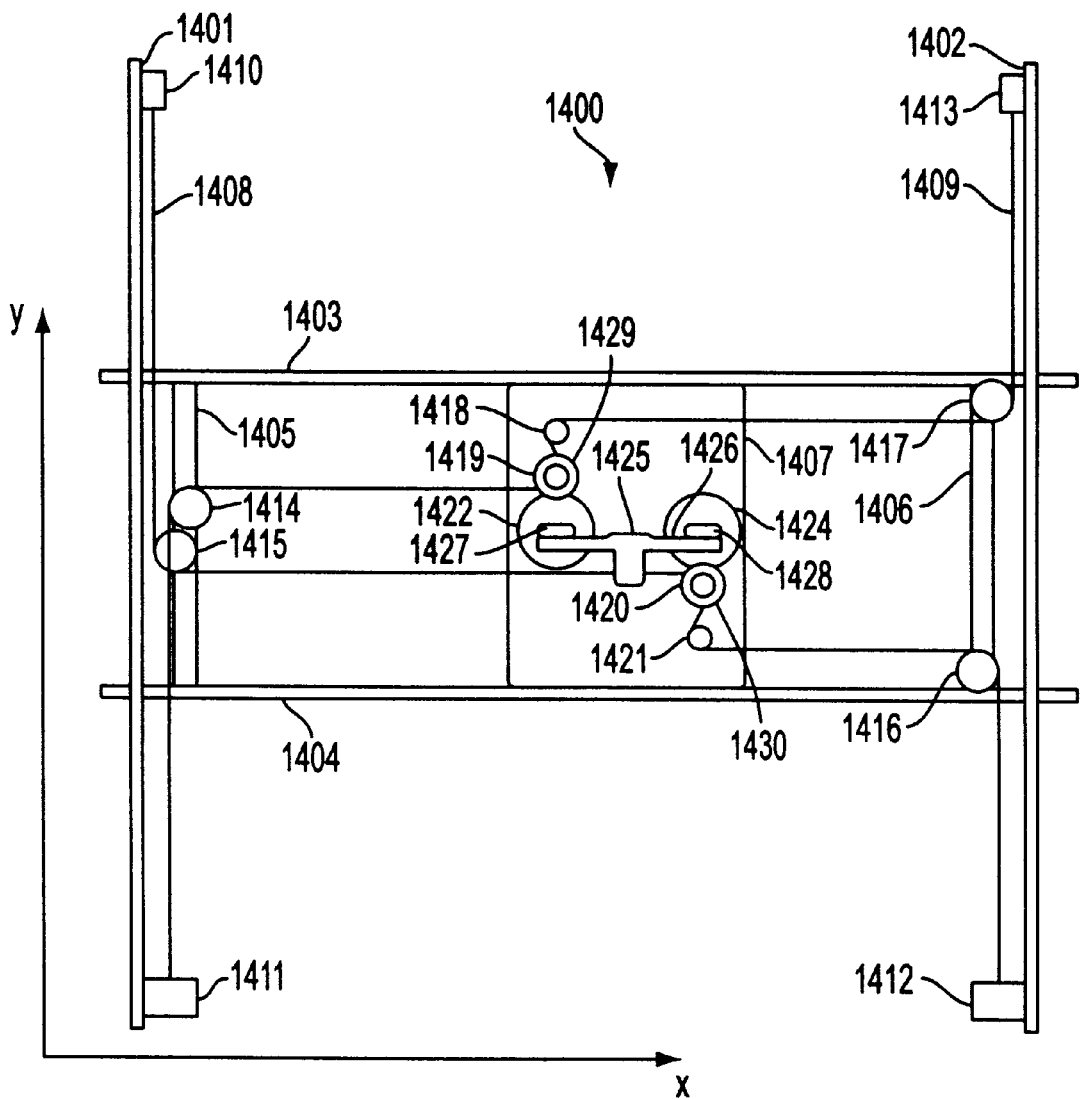
FIG. 14 is a plan view of an overhead rail cobot based on the architecture of FIG. 13, according to another embodiment of the present invention.
Figure 15:
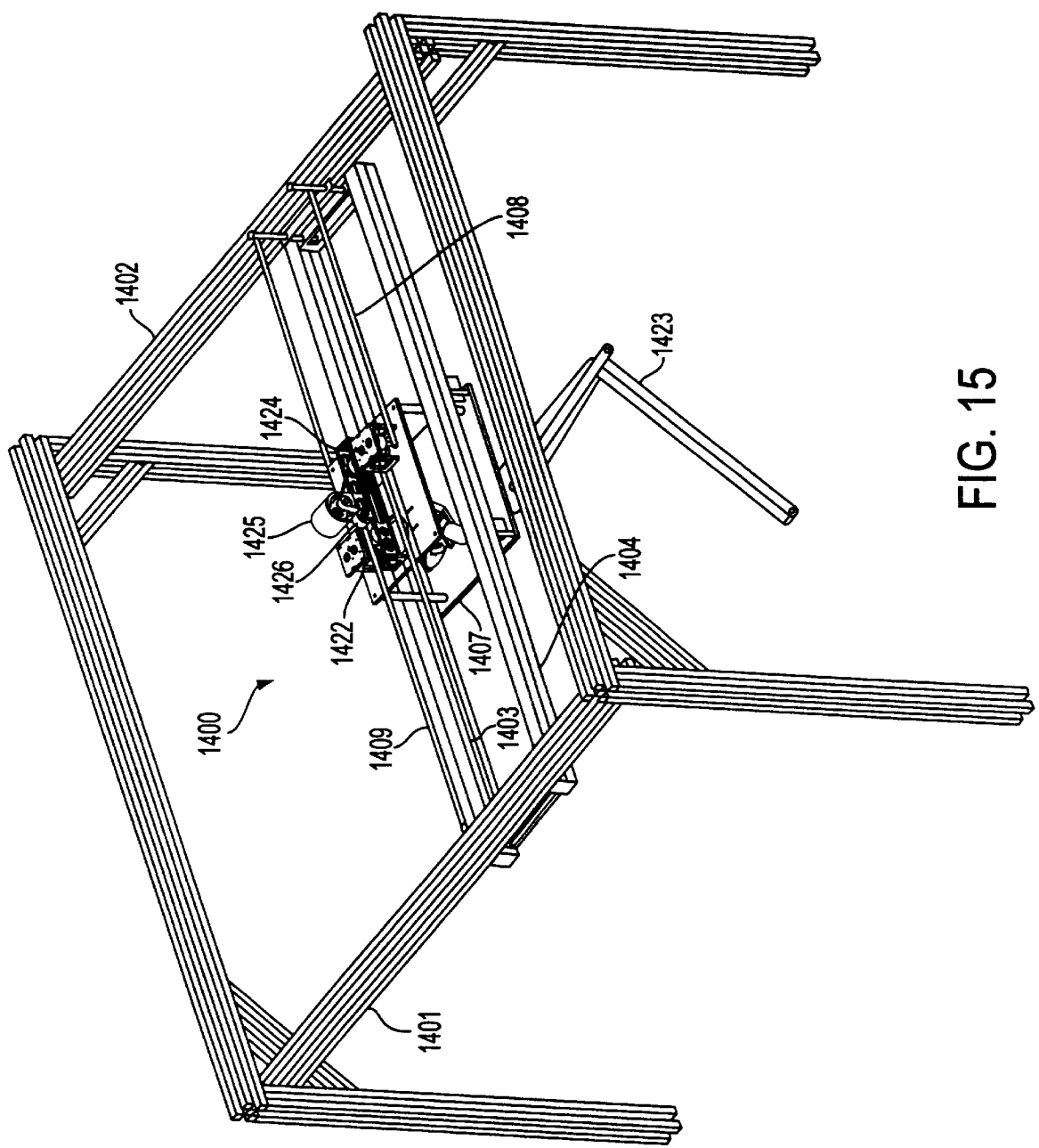
FIG. 15 is another view of the overhead rail cobot of FIG. 14.
Figure 16A:
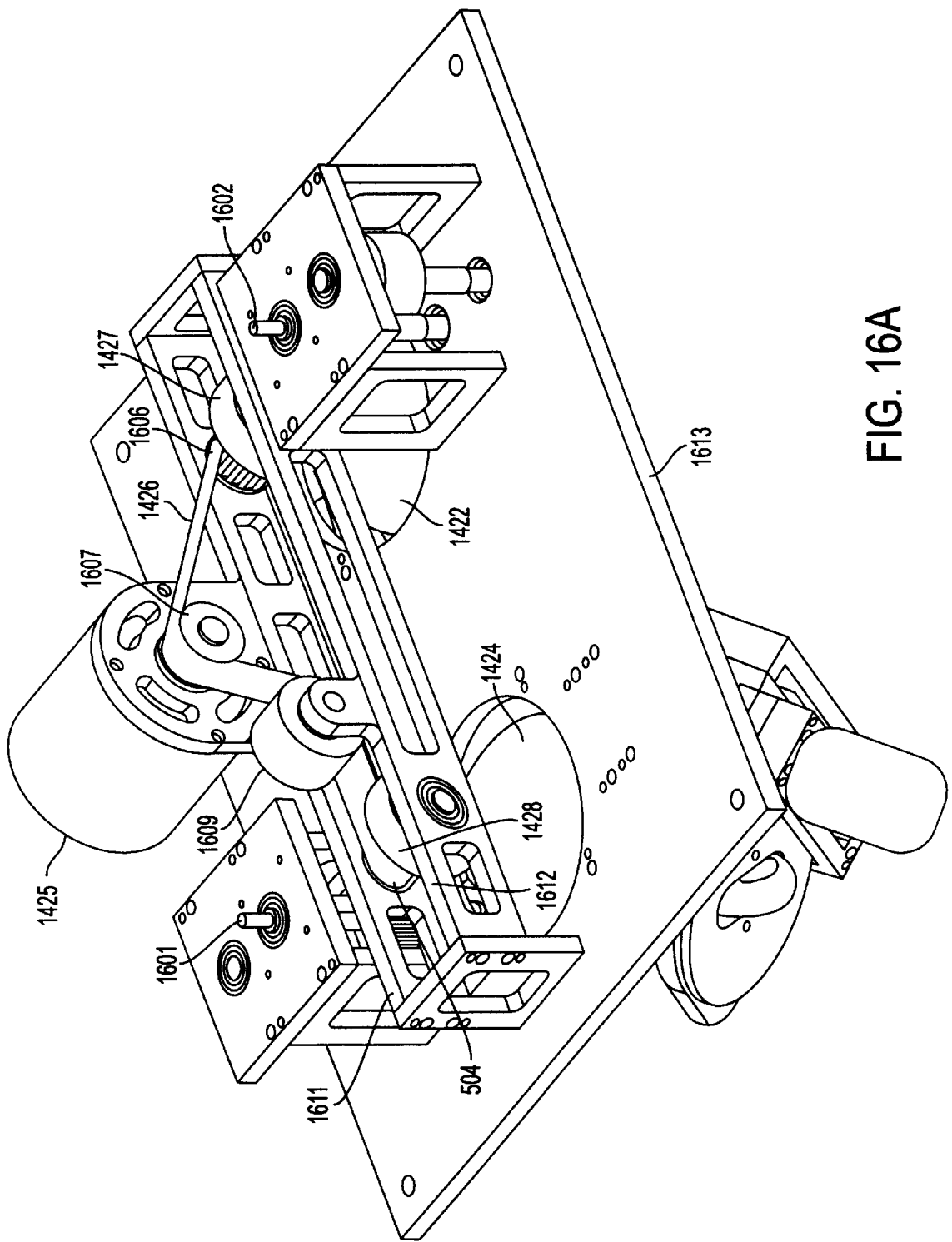
FIGS. 16(a)–(b) are different views of CVTs that can be used in the overhead rail cobot of FIG. 14.
Figure 16B:
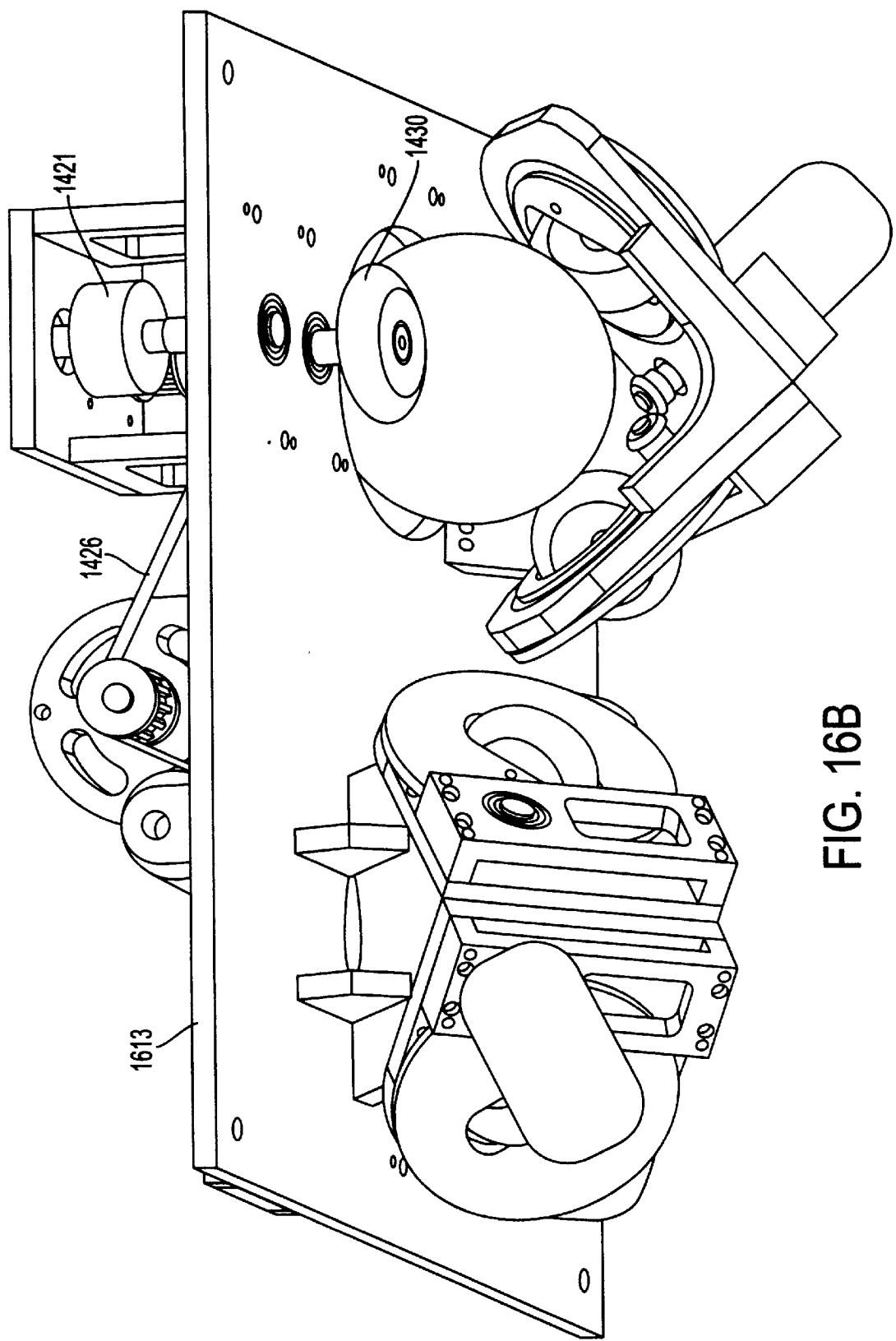

An embodiment of an overhead rail cobot based on the architecture of FIG. 13 is shown in FIGS. 14–16. FIG. 14 is a plan view of an overhead rail cobot system 1400. Cobot 1400 comprises fixed long rails 1401 and 1402, which are suspended above a work area. Cobot 1400 also includes bridge rails 1403 and 1404, which are positioned slightly below long rails 1401 and 1402 and are rigidly held together by bridge rail connectors 1405 and 1406, which maintain a fixed distance between bridge rails 1403 and 1404. Cobot 1400 also includes a platform 1407 which is slidably mounted to bridge rails 1403 and 1404 such that it slides in the x-direction along the bridge rails. Bridge rails 1403 and 1404 are slidably mounted on long rails 1401 and 1402 such that the entire bridge rail assembly can slide in the y-direction along long rails 1401 and 1402. Cobot 1400 also includes a control computer (not shown) which may be mounted to platform 1404 or connected to cobot 1400 in some other suitable fashion.

The x and y motions of the platform are coupled together by two CVT elements 1422 and 1424 and a actuator 1425 which can incorporate power assist and/or braking functions. CVT elements 1422 and 1424 and actuator 1425 will be described below in more detail in connection with FIGS. 16(*a*)–(*b*).

Cobot 1400 also includes two belts 1408 and 1409. Belt 1408 is connected to a tensioning device 1410, runs along rail 1401, and makes a 90 degree turn around idler pulley 1415, which is rotatably attached to bridge rail connector 1405. Belt 1408 traverses the bridge rail assembly, making turns around pulleys 1420 and 1421. Pulley 1420 is attached to the tetrahedral CVT 1424, and pulley 1421 is rotatably attached to platform 1407 and serves as an idler. Belt 1408 then makes another 90 degree turn around idler wheel 1416, which is rotatably attached to bridge rail connector 1406, and continues along long rail 1402, terminating at a fixed point 1412. Belt 1409 makes the opposite traversal from tensioning device 1413 to fixed point 1411, engaging pulley 1419 coupled to CVT 1422, and idler pulley 1418, along the way. As further illustrated in FIG. 15, cobot 1400 also includes a downwardly extending arm 1423 which can be attached to a payload to be moved by a human operator.

FIGS. 16(*a*)–(*b*) illustrate CVT elements 1422 and 1424 and actuator 1425 in more detail. CVTs 1422 and 1424 are both mounted on platform 1613, which is mounted on standoffs above platform 1407. CVT 1424 includes one drive roller 1430 (see FIG. 16(*b*)) that is rigidly connected to shaft 1602. Shaft 1602 is connected to pulley 1420, which is in turn coupled to belt 1408. Similarly, CVT 1422 includes a corresponding drive roller (not shown) 1601. Shaft 1601 is connected to pulley 1419, which is in turn coupled to belt 1409.

CVTs 1422 and 1424 also include drive wheels 1428 and 1427, which are connected to actuator 1425 via pulleys 1604, 1606 and 1607 and belt 1426, which is tensioned by an idler pulley 1609. Actuator 1425 may be any one of a variety of actuators known in the art, such as a motor, a brake, or a combination of the two.

Operation of cobot 1400 is as follows. In this embodiment, a human operator applies a driving force to cobot 1400 by moving a payload attached to arm 1423. These forces in turn act on platform 1407. The directional motion of the platform is controlled by ratio of speeds of pulleys 1419 and 1420, which is set by CVT elements 1422 and 1424. For instance, when CVT elements 1422 and 1424 are set to permit a 1:1 ratio of pulley speeds, platform 1407 will be constrained to move in the positive or negative y direction. As a further illustration, suppose that platform 1407 moves in the positive y direction. In that case, because the ends of belt 1408 are fixed, pulley 1416 must rotate clockwise, as must pulley 1420. Likewise, because the ends of belt 1409 are fixed, pulleys 1417 and 1419 must rotate clockwise. The speed of rotation of pulley 1419 will be the speed of motion of platform 1407 divided by the radius of pulley 1419. As a result, positive y motion results in identical speeds for pulleys 1419 and 1420, which is consistent with the setting of CVTs 1422 and 1424. Thus, motion is allowed in the y direction at this particular instant.

At this instant, however, motion is not allowed in the x direction because such motion would result in clockwise rotation of pulley 1419 and counterclockwise rotation of pulley 1420, which would be inconsistent with the setting of CVTs 1422 and 1424. The ratio of speeds of pulleys 1319 and 1320, as determined by CVTs 1422 and 1424 is, however, continuously adjustable. Thus, if CVTs 1422 and 1424 are set to permit a 1:−1 ratio of pulley speeds, platform 1407 will be constrained to move in the positive or negative x direction. By appropriate adjustment of CVT elements 1422 and 1424, platform 1407 can be constrained to move in any given direction.

As can be seen by comparing the figures and corresponding descriptions, the embodiment shown in FIGS. 14–16 is based upon the architecture of FIG. 13. In the embodiment shown in FIG. 16(*a*), pulleys 1604, 1606 and 1607 and belt 1426 correspond to the common link shown in FIG. 13. Actuator 1425 also corresponds to the power assist shown in FIG. 13. This embodiment utilizes two CVTs, and allows two directions of motion, x and y.

Figure 17:
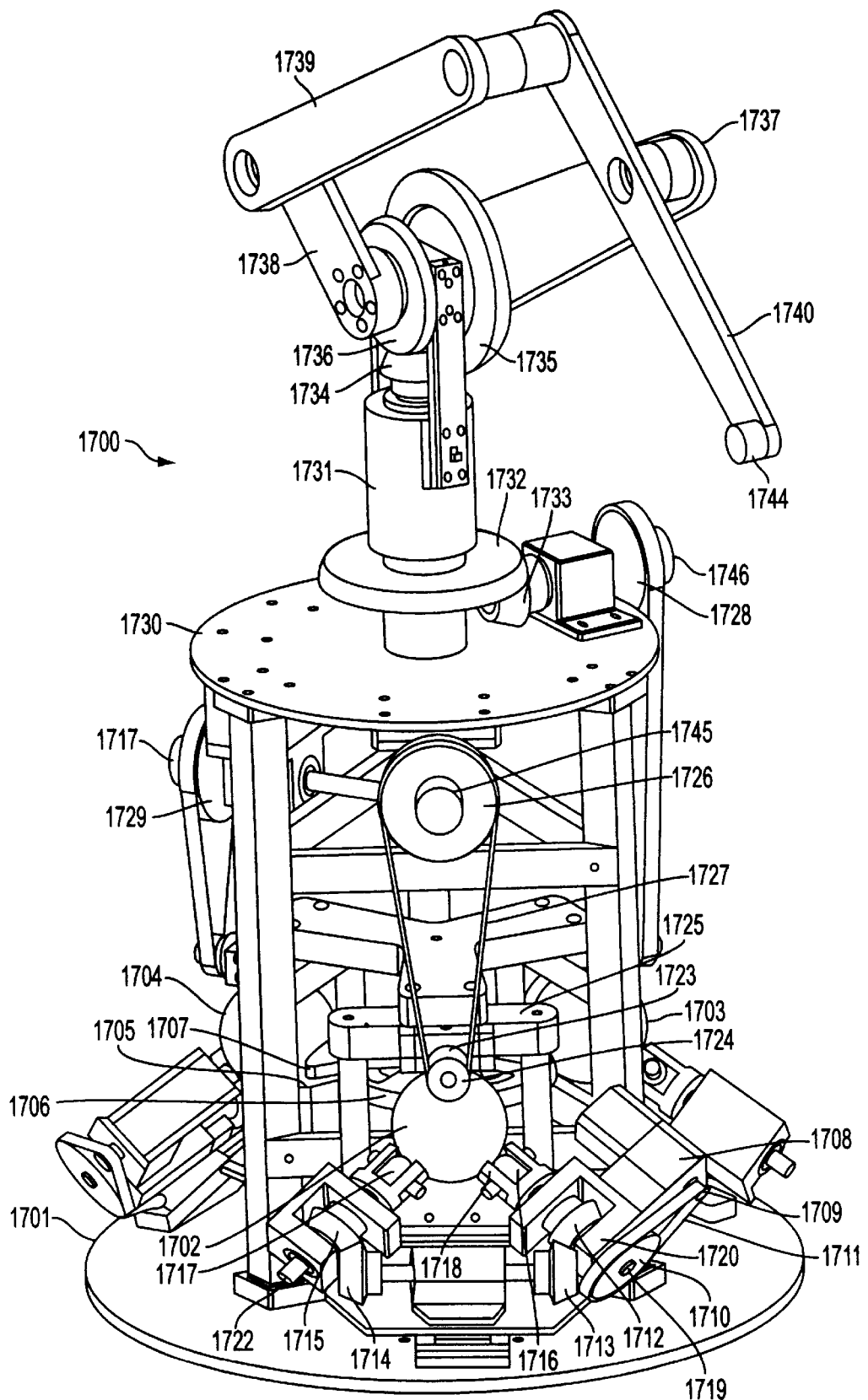
FIG. 17 is a diagram of an articulated arm cobot based on the architecture of FIG. 13, according to another embodiment of the present invention.

Power assist and/or braking functions can also be incorporated into an articulated arm cobot similar to the one depicted in FIG. 12. One embodiment of such an articulated arm cobot based on the architecture of FIG. 13 is shown in FIG. 17. In FIG. 17, cobot 1700 has a three dimensional workspace, and thus the tip of link 1740 can move in the x, y, and z, directions. Cobot 1700 includes three tetrahedral CVTs 1741, 1742 and 1743 associated with spheres 1702, 1703, and 1704, respectively. CVTs 1741–1743 are mounted on a common platform 1701 and have a drive roller 1706 in common. Drive roller 1706 is an example of the "common link" illustrated in FIG. 13. Drive roller 1706 is actuated by a power assist motor 1705 via a belt 1507. Cobot 1700 also includes a control computer (not shown) that controls the steering of CVTs 1741–1743 and the actuation of drive roller 1706.

CVTs 1741–1743 are identical in design and, therefore for simplicity, only CVT 1741 will be described. CVT 1741 has the same general tetrahedral geometry as illustrated in FIG. 11, however, certain details differ due to differences in coupling of the CVT to the cobot mechanism. In particular, the design of the steering system of cobot 1700 is based upon two sets of 45 degree mitre gears rather than two belts and a 90 degree bevel gear as shown in FIG. 11.

Roller 1716 is steered using pulleys 1709 and 1710. Pulley 1709 is rigidly attached to the shaft of motor 1708 and is coupled to pulley 1710 via belt 1711. Pulley 1710 is rigidly attached to steering shaft 1719 which is rotatably fixed in housing 1720. Housing 1720 is adjustably mounted to platform 1701, such that housing 1720 may be moved a small distance relative to platform 1701 in order to apply a pre-load to sphere 1702. Steering roller 1716 is rotatably fixed in yoke 1718, which is rigidly attached to steering shaft 1719. Accordingly, motor 1708 steers roller 1716.

Steering of roller 1717 is synchronized to the steering of roller 1716 by use of mitre gears 1712–1714. Mitre gear 1712 is rigidly fixed to steering shaft 1719, and meshes with mitre gear 1713 disposed at a 45 degree angle from mitre gear 1712. Mitre gear 1713 is rigidly attached to shaft 1721, which is rotatably mounted to housing 1720. Also fixed rigidly to shaft 1721 is mitre gear 1714. Mitre gear 1714 meshes with mitre gear 1715, which is disposed at a 45 degree angle from mitre gear 1714 and is rigidly attached to steering shaft 1722. Steering roller 1717 is also fixed to steering shaft 1722 in a manner identical to the mounting of steering roller 1716 on steering shaft 1719. This coupling of via two sets of 45 degree mitre gears 1712–1713 and 1714–1715 ensures that the steering of rollers 1716 and 1717 remains synchronized.

Drive roller 1723 is also in contact with sphere 1702 of CVT 1741. Drive roller 1723 is rotatably mounted to support structure 1725, which is rigidly fixed to platform 1701. Pulley 1724 is also rigidly attached to the same shaft as drive roller 1723, and is coupled to pulley 1726 via a belt 1727. The combined effect of CVT 1741 and belt 1727 is to couple the rotational speeds of common drive roller 1706 and pulley 1726. In an analogous fashion, CVTs 1742 and 1743 couple the rotational speed of common drive roller 1706 to the rotational speeds of pulleys 1728 and 1729, respectively.

Pulleys 1726, 1728, and 1729 are coupled to the links of the articulated arm of cobot 1700 in order to constrain its direction of motion. Pulley 1728 is coupled to hollow shaft 1731 via bevel gears 1732 and 1733. Hollow shaft 1731 is rotatably fixed to stage 1730, which is rigidly fixed to platform 1701. The entire articulated arm is mounted to hollow shaft 1731. As a result, rotation of shaft 1731 causes the entire arm assembly to rotate about a vertical axis.

Pulley 1726, through a similar arrangement of bevel gears, is coupled to the base of a hollow shaft which is concentric with, and which rotates inside of, hollow shaft 1731. Rigidly attached to the top of this inside shaft is bevel gear 1734, which is coupled to bevel gear 1735. Bevel gear 1735 is rigidly attached to link 1737. As a result, rotation of pulley 1726 is coupled to rotation of link 1737.

Pulley 1729, also through a similar arrangement of bevel gears, is coupled to the base of a shaft which is concentric with, and which rotates inside of, the hollow shaft coupled to pulley 1726. A bevel gear arrangement at the top of this shaft drives bevel gear 1736. Bevel gear 1736 is rigidly attached to link 1738. Thus, the rotation of link 1738 is coupled to the rotation of pulley 1729.

Links 1737 and 1738 are connected in a parallelogram linkage of conventional type to links 1739 and 1740. This linkage permits the tip of link 1740 to translate vertically up and down, as well as radially inward and outward. Link 1740 may also rotate about a vertical axis. As a result, link 1740 can move in three directions of motion and thus has three degrees of freedom. Due to the coupling of velocities imposed by tetrahedral CVTs 1741–1743, however, link 1740 is constrained to move in only a single direction at any given instant and thus has only one instantaneous degree of freedom. Therefore, for any fixed setting of the three steering angles of CVTs 1741–1743, the tip of link 1740 will be restricted to follow a one dimensional path through its workspace. The power to drive cobot 1700 along its instantaneously available degree of freedom may come from either the human operator, the power assist motor 1705, or a combination of both.

Cobot 1700 can also include sensors for measuring configuration speed, and intent. Intent can be measured by force sensor 1744 mounted to link 1740. Configuration and speed can be measured by optical encoders 1745, 1746 and 1747, mounted to pulleys 1726, 1729 and 1729, respectively.

The present invention has been described with respect to certain preferred embodiments, which is not meant to and should not be construed to limit the invention. Those skilled in the art will understand that variations from the embodiments and conditions described herein may be made without departing from the invention as claimed in the appended claims.

What is claimed is:

1. A robotic device allowing for collaboration with a human operator, said device having one or more joints and an endpoint movable by an operator in a plurality of directions, comprising:
    at least one non-holonomic transmission element which couples a velocity of said endpoint in one of said directions with a velocity of said endpoint in another of said directions, said nonholonomic transmission element having a steering angle which controls a ratio of said velocities, whereby mechanically allowed directions of motion of said endpoint are dictated by the steering angle of said at least one non-holonomic transmission element; and
    a computer, connected to said motor and said at least one non-holonomic transmission element, which controls the mechanically allowed directions of motion through space of said endpoint by adjusting the steering angle of said at least one non-holonomic transmission element.

2. The device of claim 1 wherein said endpoint has one instantaneous degree of freedom, a direction of said instantaneous degree of freedom being under control of said computer.

3. The device of claim 1 further comprising a memory which stores a description of a virtual surface.

4. The device of claim 1 wherein contents of said memory can be altered by the operator.

5. The device of claim 4 wherein said virtual surface includes a path to be followed by said endpoint.

6. The device of claim 4 wherein said computer controls the steering angle of said non-holonomic transmission element in order to prohibit any motion of the endpoint which would penetrate the virtual surface.

7. The device of claim 4 wherein said computer controls the steering angle of said non-holonomic transmission element so as to prohibit any motion of the endpoint that would penetrate said virtual surface when said robotic device is in contact with said virtual surface, and said computer controls the steering angle of said non-holonomic transmission element so as to provide apparent freedom of motion of said endpoint to a user when said endpoint is not in contact with said virtual surface.

8. The apparatus of claim 7, wherein said computer controls the steering angle of said non-holonomic transmission element when said endpoint is not in contact with said virtual surface in a manner such that said endpoint appears to the operator to have a plurality of degrees of freedom.

9. The device of claim 5 wherein said computer continuously adjusts the steering angle of said non-holonomic transmission element as said endpoint is moved along said path by an operator so that the endpoint will move smoothly along said path.

10. The device of claim 4 wherein the at least one non-holonomic transmission element comprises a wheel.

11. The device of claim 10 wherein said wheel couples translational velocities of motion of the endpoint.

12. The device of claim 11 wherein said wheel is confined in contact with a plane.

13. The device of claim 4, wherein the at least one non-holonomic transmission element comprises three wheels which roll in contact with a single plane.

14. The device of claim 4 wherein the at least one non-holonomic transmission element comprises a spherical transmission element confined in contact with a plurality of rollers.

15. The device of claim 4 wherein a spherical transmission element couples rotational velocities of motion of some of said rollers in a ratio set by a steering angle other of said rollers.

16. The device of claim 4 wherein a spherical transmission element couples angular velocities of two joints of the robotic device.

17. The device of claim 4 further comprising sensors for measuring a configuration of said robotic device, a heading and speed of said endpoint, and a force applied by an operator to said endpoint, wherein said computer controls the steering angle of said non-holonomic transmission element in response to the position and speed of the robotic device and the force applied by an operator to the endpoint of the robotic device.

18. The device of claim 4 further comprising a motor, connected to the non-holonomic transmission element, which receives an input from the computer and adjusts the steering angle of the non-holonomic transmission element based on the input received from the computer.

19. The device of claim 4, comprising a plurality of non-holonomic transmission elements.

20. The device of claim 19, wherein each of said plurality of non-holonomic transmission elements is located at one of the joints of the robotic device.

21. The device of claim 20 wherein the number of said non-holonomic transmission elements is greater than two.

22. The device of claim 4 wherein said computer includes software that can be reprogrammed to alter the operation of said computer.

23. The device of claim 4 wherein said endpoint comprises a tool to be manipulated by an operator.

24. The device of claim 4 wherein said endpoint comprises a payload to be moved by an operator.

25. The device of claim 4, wherein said robotic device is passive, whereby all motive power necessary to move the endpoint is supplied by the operator.

26. The device of claim 4, wherein said robotic device is active, whereby the robotic device supplies power to assist or resist forces applied by the operator to the endpoint.

27. The device of claim 26, wherein said non-holonomic transmission element is coupled to an actuator for assisting forces applied by the operator to the endpoint.

28. The device of claim 26, wherein said non-holonomic transmission element is coupled to a brake for resisting forces applied by the operator to the endpoint.

29. The device of claim 26, further comprising a plurality of non-holonomic transmission elements, said plurality of non-holonomic transmission elements including a common link.

30. The device of claim 29, wherein said common link is coupled to an actuator for assisting forces applied by the operator to the endpoint.

31. The device of claim 29, wherein said common link is coupled to a brake for resisting forces applied by the operator to the endpoint.

32. The device of claim 30, wherein said actuator is coupled to said common link in a manner such as to assist an operator in lifting loads against gravity.

33. The device of claim 30, wherein said actuator is coupled to said common link in a manner such as to assist an operator in overcoming frictional or inertial resistance in moving a large load.

34. The device of claim 31, wherein said brake is coupled to said common link in a manner such as to slow down said endpoint when it reaches a particular location.

35. The device of claim 17, further comprising:
an overhead rail assembly comprising a platform slidably mounted on a plurality of rails such that the platform can move in a plane; and
an arm having a first end attached to said platform and a second end extending downwardly from said platform, whereby said second end corresponds to the endpoint of the robotic device;
wherein said at least one non-holonomic transmission element couples directional velocities of motion of said platform in said plane.

36. The device of claim 35, wherein said arm is attached to a payload to be moved by a human operator.

37. The device of claim 36, wherein said at least one non-holonomic transmission element comprises a spherical transmission element confined in contact with a plurality of rollers.

38. The device of claim 37 wherein said overhead rail assembly comprises a plurality of pulleys, whereby a ratio of speeds of said pulleys are controlled by said spherical transmission element, and said ratio of speeds of said pulleys control directional motion of said platform in said plane.

39. The device of claim 36, wherein said at least one non-holonomic transmission element comprises a plurality of spherical transmission elements, further comprising a common link coupled to said plurality of spherical transmission elements.

40. The device of claim 17, further comprising an articulated arm assembly having a plurality of rotatable links coupled together by said at least one non-holonomic transmission element, said articulated arm assembly having an endpoint corresponding to the endpoint of the robotic device and capable of movement within a three dimensional workspace;
wherein said at least one non-holonomic transmission element couples a ratio of angular velocities of said links of said articulated arm assembly.

41. The device of claim 39 wherein said at least one non-holonomic transmission element comprises a spherical transmission element confined in contact with a plurality of rollers.

42. The device of claim 40 wherein the at least one non-holonomic transmission element comprises a plurality of spherical transmission elements each confined in contact with a plurality of rollers, each of which couples a ratio of angular velocities of a plurality of links of said articulated arm assembly.

43. The device of claim 42, further comprising a common link coupled to said plurality of spherical transmission elements.

44. An apparatus allowing for collaboration between said apparatus and a human operator, said device having one or more joints and an endpoint having a plurality of apparent degrees of freedom, comprising:

one or more joints;

an endpoint having a plurality of apparent degrees of freedom;

one or more sensors for measuring a position and speed of said endpoint and a force applied by an operator to said endpoint;

at least one continuously variable transmission element which couples a velocity of said endpoint in one of said degrees of freedom with a velocity of said endpoint in another of said degrees of freedom, said continuously variable transmission element having a steering angle which controls a ratio of said velocities, whereby said continuously variable transmission element restricts motion of said endpoint at a particular instant in time to a single instantaneous degree of freedom which is adjustable by varying said steering angle;

a motor, connected to said continuously variable transmission element which adjusts the steering angle of the continuously variable transmission element, thereby adjusting the ratio of said velocities; and a computer, which receives from said sensors signals representing the position and speed of the endpoint and the force applied by an operator to the endpoint, and controls the operation of said motor in response to said signals, thereby controlling the instantaneous degrees of freedom of said endpoint.

45. The apparatus of claim 44, wherein said computer controls said motor such that said endpoint appears to the operator to have a plurality of degrees of freedom.

46. A robotic device allowing for collaboration with a human operator, said device having one or more joints and an endpoint having a plurality of degrees of freedom, comprising:

means for determining a position and speed of said endpoint and a force applied by an operator to said endpoint;

means for coupling a velocity of said endpoint in one of said degrees of freedom with a velocity of said endpoint in another of said degrees of freedom, said continuously variable transmission element having an adjustable steering angle which controls a ratio of said velocities, whereby said coupling means restricts motion of said endpoint at a particular instant in time to a single direction of motion which is adjustable by varying said steering angle;

means for adjusting said steering angle;

means for controlling said adjusting means based on the position and speed of said endpoint and the force applied by an operator to said endpoint, thereby controlling the mechanically allowed direction of motion through space of said endpoint.

47. An apparatus as claimed in claim 46, wherein said means for controlling also controls the steering angle of said at least one non-holonomic transmission element in response to forces applied by the user when the device is remote from the virtual surface so as to provide to the user an apparent increased number of degrees of freedom of motion of the device when said device is remote from said virtual surface.

48. A method for controlling a robotic device having a plurality of joints coupled together by at least one steerable non-holonomic transmission element coupled together by at least one steerable non-holonomic transmission element and endpoint movable by an operator in a plurality of directions, said non-holonomic transmission element having a steering angle for controlling its transmission ratio, comprising:

storing a virtual surface;

determining the position and speed of the endpoint of the robotic device;

measuring the force applied by an operator to the endpoint;

adjusting a steering angle of said non-holonomic transmission element so as to prohibit any motion of the endpoint that would penetrate said virtual surface when said robotic device is in contact with said virtual surface; and adjusting the steering angle of said non-holonomic transmission element so as to provide apparent freedom of motion of the endpoint to a user when said endpoint is not in contact with the virtual surface.

49. A method for controlling a robotic device having a plurality of joints coupled together by at least one steerable non-holonomic transmission element and an endpoint movable by an operator in a plurality of directions, comprising:

storing a path to be followed by the robotic device;

determining the position and speed of the robotic device;

measuring the force applied by an operator to the robotic device;

continuously adjusting the steering angle of said non-holonomic transmission element as said robotic device is moved along said path by an operator so that the robotic device will move smoothly along said path.

* * * * *